US010514482B2

(12) United States Patent
Hebrink et al.

(10) Patent No.: US 10,514,482 B2
(45) Date of Patent: *Dec. 24, 2019

(54) MULTI-LAYER OPTICAL FILMS

(71) Applicant: 3M INNOVATIVE PROPERTIES COMPANY, St. Paul, MN (US)

(72) Inventors: Timothy J. Hebrink, Scandia, MN (US); Mark A. Roehrig, Stillwater, MN (US); Mark D. Weigel, Hugo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/082,181

(22) Filed: Mar. 28, 2016

(65) Prior Publication Data

US 2016/0209562 A1    Jul. 21, 2016

Related U.S. Application Data

(63) Continuation of application No. 13/509,851, filed as application No. PCT/US2010/056390 on Nov. 11, 2010, now Pat. No. 9,459,386.

(Continued)

(51) Int. Cl.
| | | |
|---|---|---|
| G02B 5/20 | (2006.01) | |
| G02B 1/04 | (2006.01) | |
| G02B 5/28 | (2006.01) | |
| G02B 1/14 | (2015.01) | |
| G02B 5/08 | (2006.01) | |
| G02B 1/10 | (2015.01) | |

(52) U.S. Cl.
CPC ............... *G02B 5/208* (2013.01); *G02B 1/04* (2013.01); *G02B 1/14* (2015.01); *G02B 5/0841* (2013.01); *G02B 5/0891* (2013.01); *G02B 5/283* (2013.01); *G02B 5/287* (2013.01); *G02B 1/105* (2013.01)

(58) Field of Classification Search
CPC ........ G02B 5/208–289; G02B 1/00–18; G02B 5/0841; G02B 5/0891; G02B 5/283; G02B 1/14; G02B 1/04; G02B 1/105
USPC .................................. 359/350–361
See application file for complete search history.

(56) References Cited

U.S. PATENT DOCUMENTS

| | | |
|---|---|---|
| 4,320,936 A | 3/1982 | Sawamura |
| 4,696,719 A | 9/1987 | Bischoff |

(Continued)

FOREIGN PATENT DOCUMENTS

| | | |
|---|---|---|
| EP | 0632507 | 1/1995 |
| EP | 0727813 | 8/1996 |

(Continued)

OTHER PUBLICATIONS

Affinito, "Vacuum deposited polymer/metal multilayer films for optical application", Thin Solid Films, Dec. 1995, vol. 270, Nos. 1-2, pp. 43-48.

(Continued)

*Primary Examiner* — William R Alexander
(74) *Attorney, Agent, or Firm* — James A. Baker; Gregory D. Allen

(57) ABSTRACT

Multi-layer optical film comprising optical layers reflecting at least 50 percent of incident UV light over specified wavelength ranges. Embodiments of the multi-layer optical films are useful, for example, as a UV protective covering.

25 Claims, 6 Drawing Sheets

Related U.S. Application Data

(60) Provisional application No. 61/262,417, filed on Nov. 18, 2009.

(56) References Cited

U.S. PATENT DOCUMENTS

| | | | |
|---|---|---|---|
| 4,722,515 A | 2/1988 | Ham | |
| 4,842,893 A | 6/1989 | Yializis | |
| 4,954,371 A | 9/1990 | Yializis | |
| 5,018,048 A | 5/1991 | Shaw | |
| 5,032,461 A | 7/1991 | Shaw | |
| 5,037,618 A | 8/1991 | Hager | |
| 5,097,800 A | 3/1992 | Shaw | |
| 5,125,138 A | 6/1992 | Shaw | |
| 5,227,140 A | 7/1993 | Hager | |
| 5,332,618 A | 7/1994 | Austin | |
| 5,339,198 A | 8/1994 | Wheatly | |
| 5,440,446 A | 8/1995 | Shaw | |
| 5,464,667 A | 11/1995 | Köhler | |
| 5,504,134 A | 4/1996 | Palmer | |
| 5,540,978 A | 7/1996 | Schrenk | |
| 5,547,908 A | 8/1996 | Furuzawa | |
| 5,552,927 A | 9/1996 | Wheatly | |
| 5,673,127 A | 9/1997 | Takahara | |
| 5,694,240 A | 12/1997 | Sternbergh | |
| 5,795,650 A | 8/1998 | Watanabe | |
| 5,876,688 A | 3/1999 | Laundon | |
| 5,933,273 A | 8/1999 | Ferrante | |
| 6,045,864 A | 4/2000 | Lyons | |
| 6,214,422 B1 | 4/2001 | Yializis | |
| 6,231,939 B1 | 5/2001 | Shaw | |
| 6,348,237 B2 | 2/2002 | Kohler | |
| 6,421,107 B1 | 7/2002 | Greenfield | |
| 6,449,093 B2 | 9/2002 | Hebrink | |
| 6,498,683 B2 | 12/2002 | Condo | |
| 6,613,819 B2 | 9/2003 | Johnson | |
| 6,697,195 B2 | 2/2004 | Weber | |
| 6,744,561 B2 | 6/2004 | Condo | |
| 6,783,349 B2 | 8/2004 | Neavin | |
| 6,887,919 B2 | 5/2005 | Krawinkel | |
| 6,926,952 B1 * | 8/2005 | Weber | G02B 1/111 |
| | | | 428/212 |
| 7,015,640 B2 | 3/2006 | Schaepkens | |
| 7,018,713 B2 | 3/2006 | Padiyath | |
| 7,153,588 B2 | 12/2006 | McMan | |
| 7,245,072 B2 | 7/2007 | Ouderkirk | |
| 7,494,702 B2 | 2/2009 | Oya | |
| 7,557,989 B2 | 7/2009 | Cross | |
| 7,618,709 B2 | 11/2009 | Wei | |
| 7,724,434 B2 | 5/2010 | Cross | |
| 7,906,202 B2 | 3/2011 | Padiyath | |
| 7,910,206 B2 | 3/2011 | Kiuchi | |
| 8,236,912 B2 | 8/2012 | Murakami | |
| 9,459,386 B2 * | 10/2016 | Hebrink | G02B 1/04 |
| 2003/0197197 A1 | 10/2003 | Brown | |
| 2004/0146681 A1 | 7/2004 | Naipawer, III | |
| 2004/0224150 A1 | 11/2004 | Hiramatsu | |
| 2004/0260007 A1 | 12/2004 | Yamaguchi | |
| 2005/0181212 A1 | 8/2005 | Schaepkens | |
| 2005/0186408 A1 * | 8/2005 | Condo | B29C 55/023 |
| | | | 428/212 |
| 2006/0062995 A1 | 3/2006 | Yamamoto | |
| 2006/0084780 A1 | 4/2006 | Hebrink | |
| 2007/0020451 A1 | 1/2007 | Padiyath | |
| 2007/0190318 A1 | 8/2007 | Asai | |
| 2008/0006819 A1 | 1/2008 | McCormick | |
| 2008/0158663 A1 | 7/2008 | Hsu | |
| 2008/0196664 A1 | 8/2008 | David | |
| 2008/0248296 A1 | 10/2008 | Shintani | |
| 2008/0291140 A1 | 11/2008 | Kent | |
| 2009/0109537 A1 | 4/2009 | Bright | |
| 2009/0252894 A1 | 10/2009 | McCormick | |
| 2011/0030756 A1 | 2/2011 | Honda | |
| 2011/0134514 A1 * | 6/2011 | Weibezahn | C25D 5/02 |
| | | | 359/359 |
| 2011/0249325 A1 | 10/2011 | Zehentmaier | |
| 2011/0255155 A1 | 10/2011 | Hebrink | |
| 2011/0262754 A1 * | 10/2011 | Zehentmaier | B32B 27/08 |
| | | | 428/421 |
| 2012/0088037 A1 | 4/2012 | Oki | |
| 2012/0229893 A1 | 9/2012 | Hebrink | |
| 2015/0010743 A1 * | 1/2015 | Katare | B32B 27/304 |
| | | | 428/215 |

FOREIGN PATENT DOCUMENTS

| | | |
|---|---|---|
| EP | 1837384 | 9/2007 |
| JP | 2000-091610 | 3/2000 |
| JP | 2000-227575 | 8/2000 |
| JP | 2002-231038 | 8/2002 |
| JP | 2004-330727 | 11/2004 |
| JP | 2004-338390 | 12/2004 |
| JP | 2005-031298 | 2/2005 |
| JP | 2006-303478 | 11/2006 |
| JP | 2008-200861 | 9/2008 |
| WO | WO 1993/16878 | 9/1993 |
| WO | WO 94/11175 | 5/1994 |
| WO | WO 96/19347 | 6/1996 |
| WO | WO 2000/26973 | 5/2000 |
| WO | WO 2004/108839 | 12/2004 |
| WO | WO 2005/052656 | 6/2005 |
| WO | WO 2005/078808 | 8/2005 |
| WO | WO 2005/111666 | 11/2005 |
| WO | WO 2006/132912 | 12/2006 |
| WO | WO 2007/087281 | 8/2007 |
| WO | WO 2011/062932 | 5/2011 |

OTHER PUBLICATIONS

Affinito, "Polymer-Oxide Transparent Barrier Layers", Society of Vacuum Coaters, 39th Annual Technical Conference Proceedings, (1996), 6 pages.

D'Agostino, editor, "Plasma Deposition, Treatment, and Etching of Polymers", Academic Press, Inc., New York (1990), 5 pages.

Biederman, "Plasma Polymerization Processes", Elsevier, New York (1992), 5 pages.

Shaw, "A New Vapor Deposition Process for Coating Paper and Polymer Webs", 6th International Vacuum Web Coating Conference, (1992), 7 pages.

Shaw, "A New High Speed Process for Vapor Depositing Acrylate Thin Films: An Update", Society of Vacuum Coaters 36th Annual Technical Conference Proceedings (1993), 6 pages.

Shaw, "Use of Vapor Deposited Acrylate Coatings to Improve the Barrier Properties of Metallized Film", Society of Vacuum Coaters 37th Annual Technical Conference Proceedings (1994), 8 pages.

Shaw, "Use of Evaporated Acrylate Coatings to Smooth the Surface of Polyester and Polypropylene Film and Aluminum Foil Substrates", RadTech'96 North America UV/EB Conference Proceedings, vol. II, (1996), 8 pages.

Yasuda, "Plasma Polymerization", Academic Press Inc., New York (1985), 5 pages.

International Search Report for International Application No. PCT/US2010/056390, dated Apr. 27, 2011, 4 pages.

* cited by examiner

MULTI-LAYER OPTICAL FILMS

CROSS REFERENCE TO RELATED APPLICATIONS

This application is a continuation of pending U.S. application Ser. No. 13/509,851, filed May 15, 2012 (now allowed), which is a national stage filing under 35 U.S.C. 371 of PCT/US2010/056390, filed Nov. 11, 2010, which claims the benefit of U.S. Provisional Patent Application No. 61/262,417, filed Nov. 18, 2009, the disclosures of which are incorporated by reference herein in their entireties.

BACKGROUND

Ultraviolet (UV) light degradation of materials is a significant problem for many materials. Although there are various UV protective materials known in the art, a need exists for more improvements in such materials, and preferably for more effective UV light blocking UV materials, especially those that provide long term protection (i.e., at least 10 years) protection for articles intended to have a long useful life outdoors. In particular, materials (e.g., films) made with polymers containing aromatic compounds (e.g., aromatic polyesters, aromatic polycarbonates, polystyrenes, polyethylene 2,6 naphthalate, and certain polyimides (e.g., those available under the trade designations "ULTEM" from Sabic Innovative Plastics, Pittsfield, Mass., and "KAPTON" from E.I. DuPont de Nemours, Wilmington, Del.) need substantial UV protection to last more than 10 years outdoors.

SUMMARY

In one aspect, the present disclosure describes a UV stable multi-layer optical film comprising at least a plurality of first and second optical layers collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, wherein some of at least one of the first or second optical layers (in some embodiments at least 50 percent by number of the first and/or second layers, in some embodiments all of at least one of the first or second layers) comprises a UV absorber.

In another aspect, the present disclosure describes a multi-layer optical film comprising a plurality of at least first and second optical layers having a major surface and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, and a third optical layer having first and second generally opposed first and second major surfaces and absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, wherein the major surface of the plurality of first and second optical layers is proximate (i.e., not more than 1 mm, in some embodiments, not more than 0.75 mm, 0.0.5 mm, 0.4 mm, 0.3 mm, 0.25 mm, 0.2 mm, 0.15 mm, 0.1 mm, or even not greater than 0.05 mm; in some embodiments, contacting) to the first major surface of the third optical layer, and wherein there is not another multi-layer optical film proximate the second surface of the third optical layer. Optionally, at least some of the first and/or second layers (in some embodiments at least 50 percent by number of the first and/or second layers, in some embodiments all of at least one of the first or second layers) comprise a UV absorber.

In another aspect, the present disclosure describes a multi-layer optical film comprising a first plurality of at least first and second optical layers having a major surface and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, and a third optical layer having first and second generally opposed first and second major surfaces and collectively absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, wherein the major surface of the plurality of first and second optical layers is proximate (i.e., within 1 mm, in some embodiments, not more than 0.75 mm, 0.0.5 mm, 0.4 mm, 0.3 mm, 0.25 mm, 0.2 mm, 0.15 mm, 0.1 mm, or even within 0.05 mm; in some embodiments, contacting) to the first major surface of the third optical layer, and wherein there is a second plurality of first and second optical layers having a major surface and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.0.5 mm, 0.4 mm, 0.3 mm, 0.25 mm, 0.2 mm, 0.15 mm, 0.1 mm, or even within 0.05 mm; in some embodiments, contacting) to the second major surface of the third optical layer. Optionally, at least some of the first and/or second layers (in some embodiments at least 50 percent by number of the first and/or second layers, in some embodiments all of at least one of the first or second layers) comprise a UV absorber.

In another aspect, the present disclosure describes a multi-layer optical film comprising a plurality of at least first and second optical layers having opposing first and second major surfaces and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, a third optical layer having a major surface and absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.0.5 mm, 0.4 mm, 0.3 mm, 0.25 mm, 0.2 mm, 0.15 mm, 0.1 mm, or even within 0.05 mm; in some embodiments, contacting) to the first major surface of the plurality of at least first and second optical layers, and a fourth optical layer absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.0.5 mm, 0.4 mm, 0.3 mm, 0.25 mm, 0.2 mm, 0.15 mm, 0.1 mm, or even within 0.05 mm; in some embodiments, contacting) to the second major surface of the plurality of at least first and second optical layers. Optionally, at least some of the first and/or second layers (in some embodiments at least 50 percent by number of the first and/or second layers, in some embodiments all of at least one of the first or second layers) comprise a UV absorber.

In another aspect, the present disclosure describes a multi-layer optical film comprising at least first and second optical layers reflecting at least 50 (in some embodiments, at least 55, 60, 65, 70, 75, 80, 85, 90, 95, 96, 97, or even at least 98) percent of incident light over a 30 (in some embodiments, at least 35, 40, 45, 50, 55, 60, 65, 70, 75, 80, 85, 90, 95, 100, 110, 120, or even at least 130) nanometer wavelength range in a wavelength range from 300 nanometers to 430 nanometers, optionally a third optical layer absorbing at least 50 (in some embodiments, at least 55, 60, 65, 70, 75, 80, 85, 90, or even at least 95) percent of incident light over at least a 30 (in some embodiments, at least 35, 40, 45, 50, 55, 60, 65, 70, 75, 80, 85, 90, 95, 100, 110, 120, or even at least 130) nanometer wavelength range in a wavelength range from at least 300 nanometers to 430 nanometers and a fourth optical layer comprising polyethylene naphthalate, wherein at least one of the first, second, or third optical layers absorbs at least 50 percent of incident light over at least a 30 (in some embodiments, at least 35, 40, 45, 50, 55, 60, 65, 70, 75, 80, 85, 90, 95, 100, 110, 120, or even at least 130) nanometer wavelength range in a wavelength range from at least 300 nanometers to 430 nanometers. Optionally, at least some of the first and/or second layers (in some embodiments at least 50 percent by number of the first and/or second layers, in some embodiments all of at least one of the first or second layers) comprise a UV absorber. In some embodiments, a plurality of the fourth optical layers collectively absorb at least 50 (in some embodiments, at least 55, 60, 65, 70, 75, 80, 85, 90, or even at least 95) percent of incident light over at least 30, 35, 40, 45, 50, 75, 100, 150, 200, 250, 300, 350, 400, 450, 500, 600, 700, 800, 900, 1000, 1100, 1200, 1300, 1400, 1500, 1600, 1700, 1800, 1900, 2000, or even 2100) nanometer wavelength range in a wavelength range from 400 nanometers to 2500 nanometers.

In some embodiments, multi-layer optical films described herein, incident UV light transmission through at least the first, second, third (if present), and fourth (if present) optical layers is less than 5 percent (in some embodiments, less than 4, 3, 2, or even less than 1 percent) in a wavelength range from at least 300 nanometers to 400 nanometers. In some embodiments, multi-layer optical films described herein, incident UV light transmission through at least the first, second, third (if present), and fourth (if present) optical layers is less than 5 percent (in some embodiments, less than 4, 3, 2, or even less than 1 percent) in a wavelength range from at least 300 nanometers to 430 nanometers.

Multi-layer optical films described herein are useful, for example, as a UV-protective covering. For example, the present disclosure provides a composite article comprising a substrate having a major surface, and a multi-layer optical film described herein on at least a portion of the major surface; a vehicle (e.g., a automobile or truck) window comprising a multi-layer optical film described herein; commercial graphic (i.e., an image for premise signage or fleets meant to convey a brand or promotional message); a light assembly comprising a multi-layer optical film described herein; a sign comprising a multi-layer optical film described herein; a liquid crystal display (LCD) comprising a multi-layer optical film described herein; a building exterior comprising a multi-layer optical film described herein; and a on photovoltaic module (e.g., a flexible module) comprising a multi-layer optical film described herein.

DETAILED DESCRIPTION

Figure 1:
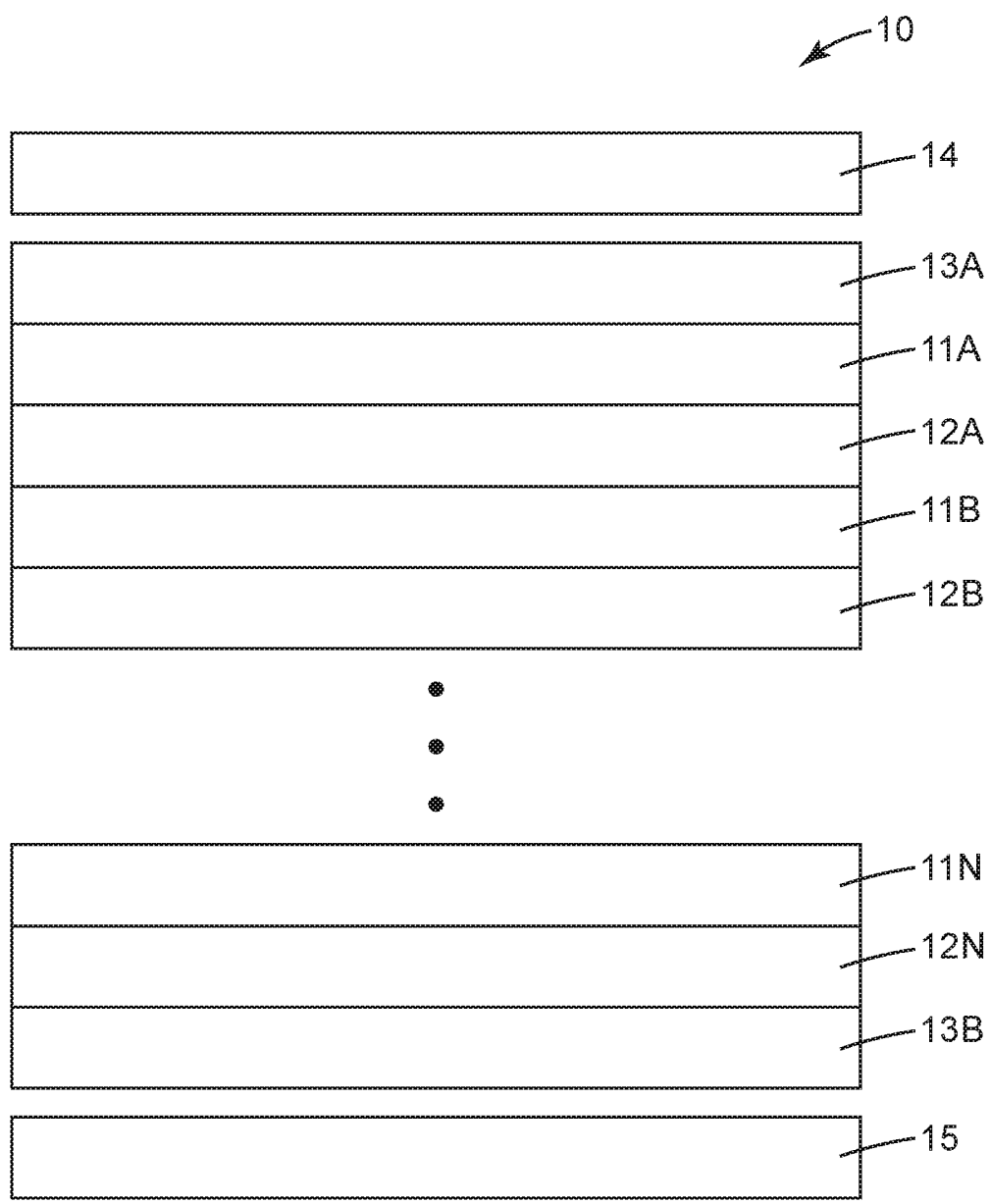
FIGS. 1-3 are schematic cross-sectional views of an exemplary multi-layer optical films described herein.

Referring to FIG. 1, exemplary multi-layer optical film 10 includes at least one hundred alternating first optical layers 11A, 11B . . . 11$_N$ and second optical layers 12A, 12B . . . 12$_N$, third optical layers 13A, 13B, optional adhesive layer 15, and optional hardcoat layer 14, wherein at least some of the third optical layers includes a UV absorber. In some embodiments, at least some of first and/or second layers include a UV absorber.

Figure 2:
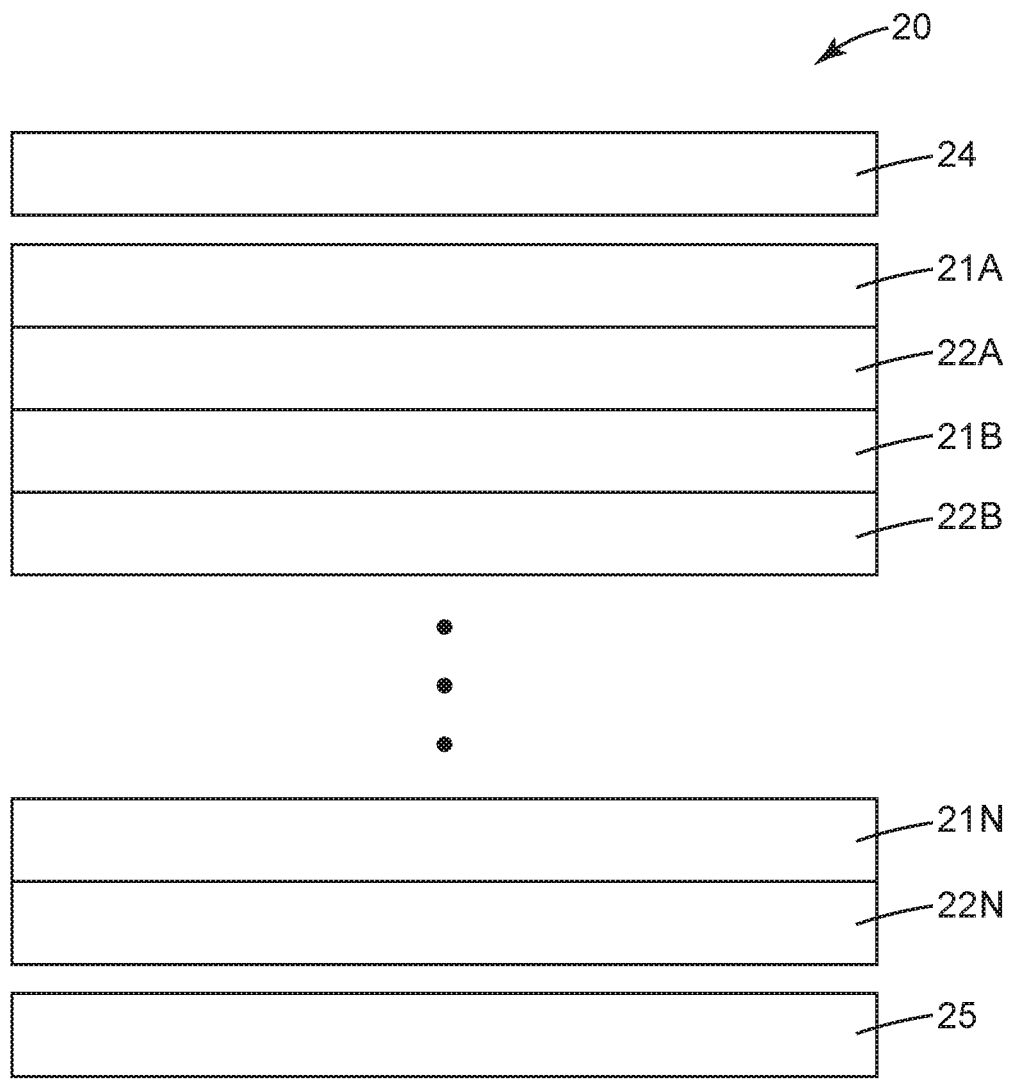

Referring to FIG. 2, exemplary multi-layer optical film 20 includes at least one hundred alternating first optical layers 21A, 21B . . . 21N and second optical layers 22A, 22B . . . 22N, wherein at least some of at least one of the first or second optical layers includes a UV absorber. Exemplary multi-layer optical film 20 optionally includes adhesive layer 25, and hardcoat layer 24. In some embodiments, hardcoat layer 24 includes a UV absorber.

Figure 3:
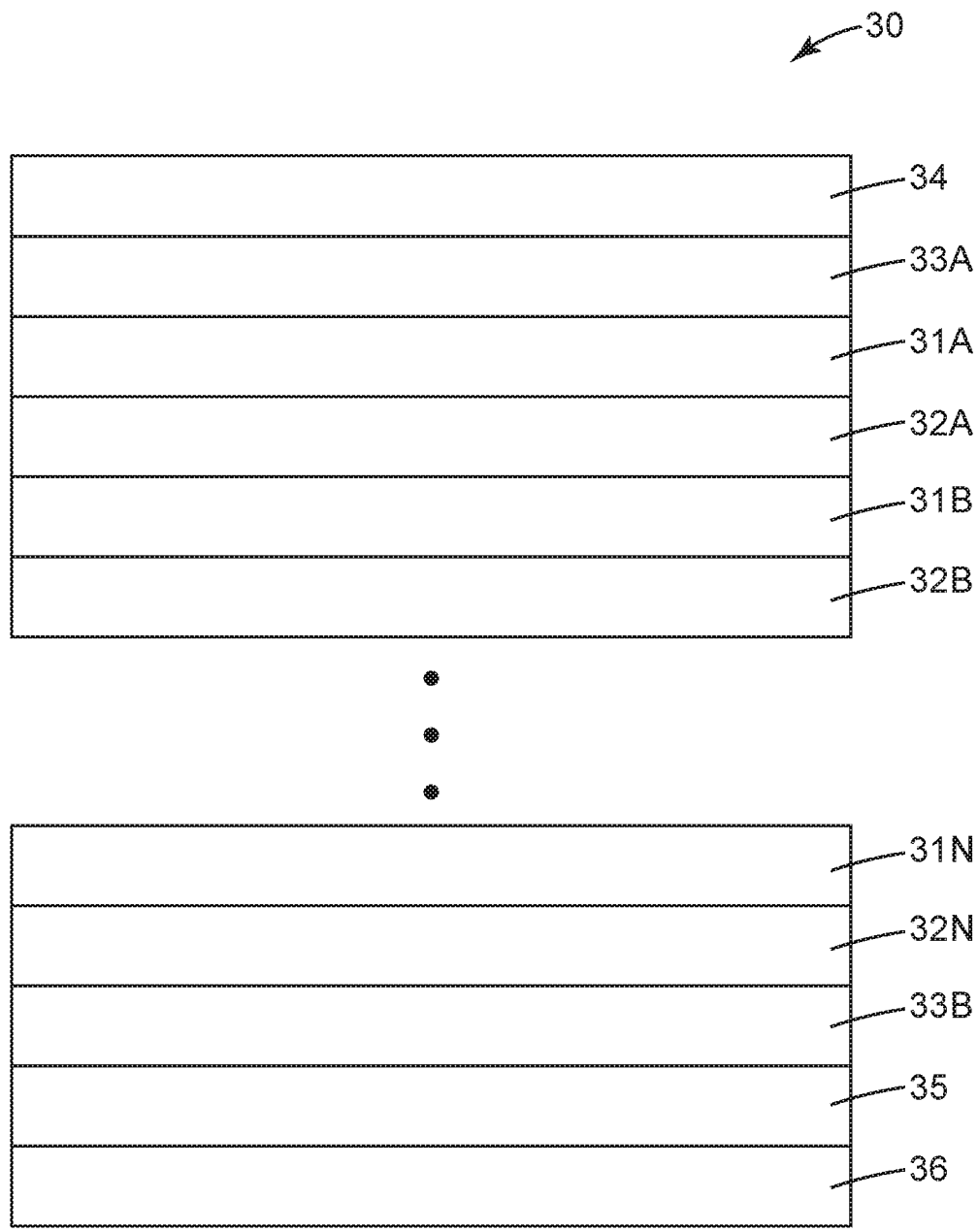

Referring to FIG. 3, exemplary multi-layer optical film 30 includes at least one hundred alternating first optical layers 31A, 31B . . . 31N and second optical layers 32A, 32B . . . 32N, optional third optical layers 33A, 33B, optional adhesive layer 35, and optional hardcoat layer 34, and fourth (polyethylene napththalate) layer 36, wherein at least some of first, second, and/or third layers include a UV absorber.

"Ultraviolet" (also "UV") as used herein refers to electromagnetic radiation having wavelengths up to 400 nm.

In general, optical multi-layer optical films described herein comprise at least 100 (typically in a range from 100 to 2000 total layers or more).

The alternating first and second layers of the multilayer optical films have a difference in refractive index of at least 0.04 (in some embodiments, at least 0.05, 0.06, 0.07, 0.08, 0.09. 0.1, 0.125, 0.15, 0.175, 0.2, 0.225, 0.25, 0.275, or even at least 0.3). In some embodiments, the first optical layer is birefringent and comprises a birefringent polymer. In some embodiments, at least one of the first, second, or third (if present) optical layer is at least one of fluoropolymer, silicone polymer, urethane polymer, or acrylate polymer (including blends thereof), and preferably is UV stable (i.e., after 3000 hours exposure to a Xenon arc lamp weatherometer according to ASTM G155-05a (October, 2005), the disclosure of which is incorporated herein by reference, has a change in b* of less than 5 units was measured with the spectrophotometer (available from Perkin-Elmer, Inc., Waltham, Mass., under the trade designation "Lambda 950").

Exemplary materials for making the optical layers that reflect (e.g., the first and second optical layers) include polymers (e.g., polyesters, copolyesters, and modified copolyesters). In this context, the term "polymer" will be understood to include homopolymers and copolymers, as well as polymers or copolymers that may be formed in a miscible blend, for example, by co-extrusion or by reaction, including transesterification. The terms "polymer" and "copolymer" include both random and block copolymers. Polyesters suitable for use in some exemplary multilayer optical films constructed according to the present disclosure generally include dicarboxylate ester and glycol subunits and can be generated by reactions of carboxylate monomer molecules with glycol monomer molecules. Each dicarboxylate ester monomer molecule has two or more carboxylic acid or ester functional groups and each glycol monomer molecule has two or more hydroxy functional groups. The dicarboxylate ester monomer molecules may all be the same or there may be two or more different types of molecules. The same applies to the glycol monomer molecules. Also included within the term "polyester" are polycarbonates derived from the reaction of glycol monomer molecules with esters of carbonic acid.

Examples of suitable dicarboxylic acid monomer molecules for use in forming the carboxylate subunits of the polyester layers include 2,6-naphthalene dicarboxylic acid and isomers thereof; terephthalic acid; isophthalic acid; phthalic acid; azelaic acid; adipic acid; sebacic acid; norbornenedicarboxylic acid; bi-cyclo-octane dicarboxylic acid; 1,4-cyclohexanedicarboxylic acid and isomers thereof; t-butylisophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to C1-C10 straight-chain or branched alkyl groups.

Examples of suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclooctanediol; trimethylolpropane; pentaerythritol; 1,4-benzenedimethanol and isomers thereof; Bisphenol A; 1,8-dihydroxybiphenyl and isomers thereof; and 1,3-bis(2-hydroxyethoxy)benzene.

Another exemplary birefringement polymer useful for the reflective layer(s) is polyethylene terephthalate (PET), which can be made, for example, by reaction of terephthalic dicarboxylic acid with ethylene glycol. Its refractive index for polarized incident light of 550 nm wavelength increases when the plane of polarization is parallel to the stretch direction from about 1.57 to as high as about 1.69. Increasing molecular orientation increases the birefringence of PET. The molecular orientation may be increased by stretching the material to greater stretch ratios and holding other stretching conditions fixed. Copolymers of PET (CoPET), such as those described in U.S. Pat. No. 6,744,561 (Condo et al.) and U.S. Pat. No. 6,449,093 (Hebrink et al.), the disclosures of which are incorporated herein by reference, are particularly useful for their relatively low temperature (typically less than 250° C.) processing capability making them more coextrusion compatible with less thermally stable second polymers. Other semicrystalline polyesters suitable as birefringent polymers include polybutylene terephthalate (PBT), polyethylene terephthalate (PET), and copolymers thereof such as those described in U.S. Pat. No. 6,449,093 B2 (Hebrink et al.) or U.S. Pat. Pub. No. 20060084780 (Hebrink et al.), the disclosures of are incorporated herein by reference. Another useful birefringent polymer is syndiotactic polystyrene (sPS).

Further, for example, the second (layer) polymer of the multilayer optical film can be made from a variety of polymers having glass transition temperatures compatible with that of the first layer and having a refractive index similar to the isotropic refractive index of the birefringent polymer. Examples of other polymers suitable for use in optical films and, particularly, in the second polymer include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer can be formed from homopolymers and copolymers of polyesters, polycarbonates, fluoropolymers, and polydimethylsiloxanes, and blends thereof.

The third (UV-absorbing) optical layer(s), if present, and fourth (UV-absorbing) layer(s), if present, comprises a polymer and a UV-absorber, and preferably serves as a UV protective layer. Typically, the polymer is a thermoplastic polymer. Examples of suitable polymers include polyesters (e.g., polyethylene terephthalate), fluoropolymers, acrylics (e.g., polymethyl methacrylate), silicone polymers (e.g., thermoplastic silicone polymers), styrenic polymers, polyolefins, olefinic copolymers (e.g., copolymers of ethylene and norbornene available as "TOPAS COC" from Topas Advanced Polymers of Florence, Ky.), silicone copolymers, fluoropolymers, and combinations thereof (e.g., a blend of polymethyl methacrylate and polyvinylidene fluoride).

Other exemplary polymers, for the optical layers, especially for use in the second layer, include homopolymers of polymethylmethacrylate (PMMA), such as those available from Ineos Acrylics, Inc., Wilmington, Del., under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt % methylmethacrylate (MMA) monomers and 25 wt % ethyl acrylate (EA) monomers, (available from Ineos Acrylics, Inc., under the trade designation "PERSPEX CP63" or Arkema, Philadelphia, Pa., under the trade designation "ATOGLAS 510"), a CoPMMA formed with MMA comonomer units and n-butyl methacrylate (nBMA) comonomer units, or a blend of PMMA and poly(vinylidene fluoride) (PVDF).

Additional suitable polymers for the optical layers, especially for use in the second layer, include polyolefin copolymers such as poly (ethylene-co-octene) (PE-PO) available from Dow Elastomers, Midland, Mich., under the trade designation "ENGAGE 8200," poly (propylene-co-ethylene) (PPPE) available from Atofina Petrochemicals, Inc., Houston, Tex., under the trade designation "Z9470," and a copolymer of atactic polypropylene (aPP) and isotatctic polypropylene (iPP). The multilayer optical films can also include, for example, in the second layers, a functionalized polyolefin, such as linear low density polyethylene-graft-maleic anhydride (LLDPE-g-MA) such as that available from E.I. duPont de Nemours & Co., Inc., Wilmington, Del., under the trade designation "BYNEL 4105."

Preferred polymer compositions for the third layer and/or second layers in alternating layers with the at least one birefringent polymer include PMMA, CoPMMA, poly(dimethylsiloxane oxamide) based segmented copolymer (SPOX), fluoropolymers including homopolymers such as PVDF and copolymers such as those derived from tetrafluoroethylene, hexafluoropropylene, and vinylidene fluoride (THV), blends of PVDF/PMMA, acrylate copolymers, styrene, styrene copolymers, silicone copolymers, polycarbonate, polycarbonate copolymers, polycarbonate blends, blends of polycarbonate and styrene maleic anhydride, and cyclic-olefin copolymers.

The selection of the polymer combinations used in creating the multilayer optical film depends, for example, upon the desired bandwidth that will be reflected. Higher refractive index differences between the birefringent polymer and the second polymer create more optical power thus enabling more reflective bandwidth. Alternatively, additional layers may be employed to provide more optical power. Preferred combinations of birefringent layers and second polymer layers may include, for example, the following: PET/THV, PET/SPOX, PEN/THV, PEN/SPOX, PEN/PMMA, PET/CoPMMA, PEN/CoPMMA, CoPEN/PMMA, CoPEN/SPOX, sPS/SPOX, sPS/THV, CoPEN/THV, PET/fluoroelastomers, sPS/fluoroelastomers and CoPEN/fluoroelastomers.

In one embodiment, two or more multilayer optical mirrors with different reflection bands are laminated together to broaden the reflection band. For example, a PET/CoPMMA multilayer reflective mirror which reflects 98% of the light from 350 nm to 420 nm would be laminated to a PET/CoPMMA multilayer reflective mirror which reflects 90% of the light from 900 nm to 1200 nm to create a UV stabilized IR mirror reflecting light from 900 nm to 1200 nm. In another example, a PET/CoPMMA multilayer reflective mirror that reflects 96.8% of the light from 370 nm to 800 nm could be laminated to a multilayer reflective mirror which reflects 96.8% of the light from 700 nm to 1300 nm to create a broader band mirror reflecting light from 400 nm to 1300 nm.

Preferred material combinations for making the optical layers that reflect UV light (e.g., the first and second optical layers) include PMMA (e.g., first layer)/THV (e.g., second layer), PC (polycarbonate) (e.g., first layer)/PMMA (e.g., second layer), and PET e.g., first layer)/CoPMMA (e.g., second layer).

Exemplary material for making the optical layers that absorb UV light (e.g., the third optical layer) include PET, CoPET, PC, PMMA, CoPMMA, or blends of PMMA and PVDF.

A UV absorbing layer (e.g., a UV protective layer) aids in protecting the visible/IR-reflective optical layer stack from UV-light caused damage/degradation over time by absorbing UV-light (preferably any UV-light) that may pass through the UV-reflective optical layer stack. In general, the UV-absorbing layer(s) may include any polymeric composition (i.e., polymer plus additives), including pressure-sensitive adhesive compositions, that is capable of withstanding UV-light for an extended period of time.

Solar light, in particular the ultraviolet radiation from 280 to 400 nm, can induce degradation of plastics, which in turn results in color change and deterioration of optical and mechanical properties. Inhibition of photo-oxidative degradation is important for outdoor applications wherein long term durability is mandatory. The absorption of UV-light by polyethylene terephthalates, for example, starts at around 360 nm, increases markedly below 320 nm, and is very pronounced at below 300 nm. Polyethylene naphthalates strongly absorb UV-light in the 310-370 nm range, with an absorption tail extending to about 410 nm, and with absorption maxima occurring at 352 nm and 337 nm. Chain cleavage occurs in the presence of oxygen, and the predominant photooxidation products are carbon monoxide, carbon dioxide, and carboxylic acids. Besides the direct photolysis of the ester groups, consideration has to be given to oxidation reactions, which likewise form carbon dioxide via peroxide radicals.

A UV absorbing layer may protect the multilayer optical film by reflecting UV light, absorbing UV light, scattering UV light, or a combination thereof. In general, a UV absorbing layer may include any polymer composition that is capable of withstanding UV radiation for an extended period of time while either reflecting, scattering, or absorbing UV radiation. Examples of such polymers include PMMA, CoPMMA, silicone thermoplastics, fluoropolymers, and their copolymers, and blends thereof. An exemplary UV absorbing layer comprises PMMA/PVDF blends.

A variety of optional additives may be incorporated into an optical layer to make it UV absorbing. Examples of such additives include at least one of an ultra violet absorber(s), a hindered amine light stabilizer(s), or an anti-oxidant(s) thereof.

Particularly desirable UV absorbers are red shifted UV absorbers (RUVA) which absorb at least 70% (in some embodiments, at least 80%, particularly preferably greater than 90% of the UV light in the wavelength region from 180 nm to 400 nm. Typically, it is desirable if the RUVA is highly soluble in polymers, highly absorptive, photo-permanent and thermally stable in the temperature range from 200° C. to 300° C. for extrusion process to form the protective layer. The RUVA can also be highly suitable if they can be copolymerizable with monomers to form protective coating layer by UV curing, gamma ray curing, e-beam curing, or thermal curing processes.

RUVAs typically have enhanced spectral coverage in the long-wave UV region, enabling it to block the high wavelength UV light that can cause yellowing in polyesters. Typical UV protective layers have thicknesses in a range from 13 micrometers to 380 micrometers (0.5 mil to 15 mil) with a RUVA loading level of 2-10% by weight. One of the most effective RUVA is a benzotriazole compound, 5-trifluoromethyl-2-(2-hydroxy-3-alpha-cumyl-5-tert-octylphenyl)-2H-benzotriazole (sold under the trade designation "CGL-0139" from Ciba Specialty Chemicals Corporation, Tarryton, N.Y.). Other preferred benzotriazoles include 2-(2-hydroxy-3,5-di-alpha-cumylphehyl)-2H-benzotriazole, 5-chloro-2-(2-hydroxy-3-tert-butyl-5-methylphenyl)-2H- benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole. Further preferred RUVA includes 2(-4,6-diphenyl-1-3,5-triazin-2-yl)-5-hexyloxy-phenol. Other exemplary UV absorbers include those available from Ciba Specialty Chemicals Corporation under the trade designation "TINUVIN 1577," "TINUVIN 900," and "TINUVIN 777." Other exemplary UV absorbers are available in a polyester master batch from Sukano Polymers Corporation, Dunkin S.C., under the trade designations "TA07-07 MB." An exemplary UV absorber for polycarbonate is a masterbatch from Sukano Polymers Corporation, Dunkin S.C., under the trade designations "TA28-09 MB01." In addition, the UV absorbers can be used in combination with hindered amine light stabilizers (HALS) and anti-oxidants. Exemplary HALS include those available from Ciba Specialty Chemicals Corporation, under the trade designation "CHIMASSORB 944" and "TINUVIN 123." Exemplary anti-oxidants include those obtained under the trade designations "IRGANOX 1010" and "ULTRANOX 626", also available from Ciba Specialty Chemicals Corporation.

In some embodiments, the third UV absorbing (protective) layer is a multilayer optical film that reflects wavelengths of light from about 350 to about 400 nm, (in some embodiments from 300 nm to 400 nm). In these embodiments, the polymers for the UV absorbing layer preferably do not absorb UV light in the 300 nm to 400 nm range. Examples of the materials that are desirable for such embodiments include PET/THV, PMMA/THV, PET/SPOX, PMMA/SPOX, sPS/THV, sPS/SPOX, modified polyolefin copolymers (EVA) with THV, TPU/THV, and TPU/SPOX. In one exemplary embodiment, THV available under the trade designation "DYNEON THV 220 GRADE" and "DYNEON THV 2030 GRADE" from Dyneon LLC, Oakdale, Minn., are employed with PMMA for multilayer UV mirrors reflecting 300-400 nm or with PET for multilayer mirrors reflecting 350-400 nm.

Other additives may be included in a UV absorbing layer (e.g., a UV protective layer). Small particle non-pigmentary zinc oxide and titanium oxide can also be used as blocking or scattering additives in a UV absorbing layer. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. U.S. Pat. No. 5,504,134 (Palmer et al.) describes attenuation of polymer substrate degradation due to ultraviolet radiation through the use of metal oxide particles in a size range of about 0.001 micrometer to about 0.2 micrometer in diameter, and more preferably from about 0.01 micrometer to about 0.15 micrometer in diameter. U.S. Pat. No. 5,876,688 (Laundon) describes a method for producing micronized zinc oxide that are small enough to be transparent when incorporated as UV blocking and/or scattering agents in paints, coatings, finishes, plastic articles, cosmetics and the like which are well suited for use in the present invention. These fine particles such as zinc oxide and titanium oxide with particle size ranged from 10-100 nm that can attenuate UV radiation are available, for example, from Kobo Products, Inc. South Plainfield, N.J. Flame retardants may also be incorporated as an additive in a UV protective layer.

In addition to adding UV absorbers, HALS, nano-scale particles, flame retardants, and anti-oxidants to a UV absorbing layer, the UV absorbers, HALS, nano-scale particles, flame retardants, and anti-oxidants can be added to the multilayer optical films, and any optional durable top coat layers. Fluorescing molecules and optical brighteners can also be added to a UV absorbing layer, the multilayer optical layers, an optional hardcoat layer, or a combination thereof.

The desired thickness of a UV protective layer is typically dependent upon an optical density target at specific wavelengths as calculated by Beers Law. In some embodiments, the UV protective layer has an optical density greater than 3.5, 3.8, or 4 at 380 nm; greater than 1.7 at 390 nm; and greater than 0.5 nm at 400 nm. Those of ordinary skill in the art recognize that the optical densities typically should remain fairly constant over the extended life of the article in order to provide the intended protective function.

The UV protective layer, and any optional additives, may be selected to achieve the desired protective functions such as UV protection. Those of ordinary skill in the art recognize that there are multiple means for achieving the noted objectives of the UV protective layer. For example, additives that are very soluble in certain polymers may be added to the composition. Of particular importance, is the permanence of the additives in the polymer. The additives should not degrade or migrate out of the polymer. Additionally, the thickness of the layer may be varied to achieve desired protective results. For example, thicker UV protective layers would enable the same UV absorbance level with lower concentrations of UV absorbers, and would provide more UV absorber permanence attributed to less driving force for UV absorber migration. One mechanism for detecting the change in physical characteristics is the use of the weathering cycle described in ASTM G155-05a (October, 2005) and a D65 light source operated in the reflected mode. Under the noted test, and when the UV protective layer is applied to the article, the article should withstand an exposure of at least 18,700 kJ/m2 at 340 nm before the b* value obtained using the CIE L*a*b* space increases by 5 or less, 4 or less, 3 or less, or 2 or less before the onset of significant cracking, peeling, delamination or haze.

The fourth optical layer, which in some embodiments is optional, comprising polyethyl enenapththalate, can be made, for example, as described in Example 15, below.

Multilayer optical films described herein can be made using the general processing techniques, such as those described in U.S. Pat. No. 6,783,349 (Neavin et al.), the disclosure of which is incorporated herein by reference.

Desirable techniques for providing a multilayer optical film with a controlled spectrum include the use of an axial rod heater control of the layer thickness values of coextruded polymer layers as described, for example, in U.S. Pat. No. 6,783,349 (Neavin et al.); timely layer thickness profile feedback during production from a layer thickness measurement tool such as e.g. an atomic force microscope (AFM), a transmission electron microscope, or a scanning electron microscope; optical modeling to generate the desired layer thickness profile; and repeating axial rod adjustments based on the difference between the measured layer profile and the desired layer profile.

The basic process for layer thickness profile control involves adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers.

Once calibrated, the necessary power adjustments can be calculated once given a target profile and a measured profile. The procedure is repeated until the two profiles converge.

The layer thickness profile (layer thickness values) of multi-layer optical film described herein reflecting at least 50 percent of incident UV light over a specified wavelength range can be adjusted to be approximately a linear profile with the first (thinnest) optical layers adjusted to have about a ¼ wave optical thickness (index times physical thickness) for 300 nm light and progressing to the thickest layers which would be adjusted to be about ¼ wave thick optical thickness for 400 nm light.

Optional a hardcoat can be provided by techniques known in the art, including those described in U.S. Pat. No. 7,153,588 (McMan), the disclosure of which is incorporated herein by reference. Use of hardcoats can, for example, reduce or prevent premature degradation of the article due to exposure to outdoor elements. The hardcoat is generally abrasion and impact resistant and does not interfere with the primary function of reflecting a selected bandwidth of electromagnetic radiation.

A hardcoat can also provide mechanical durability to the article. Some mechanisms for measuring mechanical durability may be either impact or abrasion resistance. Taber abrasion is one test to determine a film's resistance to abrasion, and resistance to abrasion is defined as the ability of a material to withstand mechanical action such as rubbing scrapping, or erosion. According to the ASTM D1044-08 (2008) test method, a 500-gram load is placed on top of CS-10 abrader wheel and allowed to spin for 50 revolutions on a 25.8 cm2 (4 in.2) test specimen. The reflectivity of the sample before and after the Taber abrasion test is measured, and results are expressed by changes in % reflectivity. For the purpose of this invention, change in % reflectivity is expected to be less than 20%, preferred to be less than 10% and particularly more preferred to be less than 5%.

Other suitable tests for mechanical durability include break elongation, pencil hardness, sand blast test, and sand shaking abrasion. UV absorbers and appropriate UV stabilizers described above can be added into the top coat for stabilizing the coating as well as for protection of the substrates. The substrates coated with such a durable hard coat are thermoformable before being fully cured at an elevated temperature, and a durable hard coat can then be formed by a post curing at 80° C. for 15-30 minutes. In addition, siloxane components used as a durable top coat are hydrophobic in nature and can provide an easy clean surface function to the articles disclosed in this invention.

Due to the outdoor application, weathering is a desirable characteristic of the article. Accelerated weathering studies are one option for qualifying the performance of the article. Accelerated weathering studies are generally performed on films using techniques similar to those described in ASTM G-155-05a (October 2005), "Standard practice for exposing non-metallic materials in accelerated test devices that use laboratory light sources". The noted ASTM technique is considered as a sound predictor of outdoor durability, that is, ranking materials performance correctly.

Hardcoat layers may include at least one of PMMA/PVDF blends, thermoplastic polyurethanes, curable or cross-linked polyurethanes, CoPET, cyclic olefin copolymers (COC's), fluoropolymers and their copolymers such as PVDF, ETFE, FEP, and THV, thermoplastic and curable acrylates, cross-linked acrylates, cross-linked urethane acrylates, cross-linked urethanes, curable or cross-linked polyepoxides, or cross-linked silicones. Strippable polypropylene copolymer skins may also be employed. Alternatively, for example, silane silica sol copolymer hardcoating can be applied to improve scratch resistance. The hardcoat may contain UV absorbers, HALS, and anti-oxidants as described above.

Optionally a tie layer may be interposed between the outer surface of the stack of first and second layers and UV protective layer, a hardcoat layer, etc. to assist in adherence and provide long term stability in use. Examples of tie layers include: hot-melt adhesives, and CoPETs including modifications such as with functional groups sulfonic acids, PMMA/PVDF blends, modified olefins with functional comonomers such as maleic anhydride, acrylic acid, methacrylic acid or vinyl acetate. Additionally, UV or thermally curable acrylates, silicones, epoxies, siloxanes, urethane acrylates may be suitable as tie layers. The tie-layers may optionally contain UV absorbers as described above. The tie layers may optionally contain conventional plasticizers, tackifiers, or combinations thereof. The tie layer may be applied utilizing conventional film forming techniques.

It is within the scope of the present disclosure to include UV absorbing layers (e.g. UV protective layers) on both major surfaces of the stack of first and second optical layers. Also, in some embodiments, it may be desirable to have a UV absorbing layer (e.g., UV protective layer) on the opposite of the stack of first and second optical layers for a specific application requirement. In some embodiments, it may be desirable to provide a UV absorbing layer (e.g. UV protective layer) only on the multilayer optical film in order to provide backside protection from UV radiation. Other potential embodiments can include carbon black or an IR absorbing layer on one or more of the major surfaces of the stack of first and second optical layers. In another embodiment an antireflective coating can be on the backside of the stack of first and second optical layers to reduce or prevent backside IR reflection. Tie layers, such as those discussed above can be used in providing these additional exemplary embodiments.

Some embodiments of multi-layer optical films described herein have a UV transmission band edge in a range from 10 to 90 percent transmission spanning less than 20 (in some embodiments, less than 10) nanometers.

Exemplary thicknesses of multi-layer optical films described herein have a thickness in a range from 25 micrometers to 250 micrometers. Exemplary thicknesses of optical layers (e.g., the third optical layer) that absorb have a collective thickness in a range from 10 micrometers to 200 micrometers.

Multi-layer optical films described herein are useful, for example, as a UV protective covering. For example, the present disclosure provides a composite article comprising a substrate having a major surface, and a multi-layer optical film described herein on at least a portion of the major surface; a vehicle (e.g., a automobile or truck) window comprising a multi-layer optical film described herein; Commercial graphic (i.e., an image for premise signage or fleets meant to convey a brand or promotional message); a light assembly comprising a multi-layer optical film described herein; a sign comprising a multi-layer optical film described herein; an LCD comprising a multi-layer optical film described herein; a building exterior comprising a multi-layer optical film described herein; and a on photovoltaic module (e.g., a flexible module) comprising a multi-layer optical film described herein.

Figure 4:
FIG. 4 is a schematic cross-sectional view of an exemplary automobile windshield comprising multi-layer optical film described herein.

Referring to FIG. 4, exemplary automobile windshield 30 includes automobile windshield glass 41, 42, exemplary multi-layer optical film described herein 43, IR mirror layer 44, and adhesive layers 45, 46, 47. The multi-layer optical film can be incorporated into the automobile window construction using techniques generally known in the art.

Figure 5:
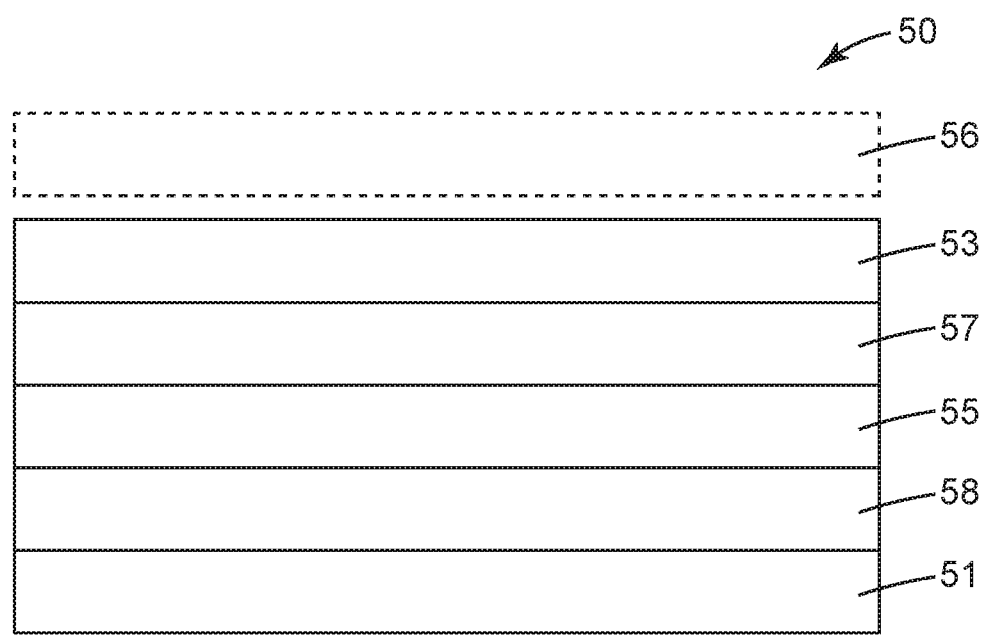
FIG. 5 is a schematic cross-sectional view of an exemplary window comprising multi-layer optical film described herein.

Referring to FIG. 5, exemplary architectural window 50 includes window glass 51, 52, exemplary multi-layer optical film described herein 53, IR mirror layer 55, adhesive layers 57, 58, and optional hardcoat layer 56. The multi-layer optical film can be incorporated into automobile window constructions using techniques generally known in the art.

Figure 6:
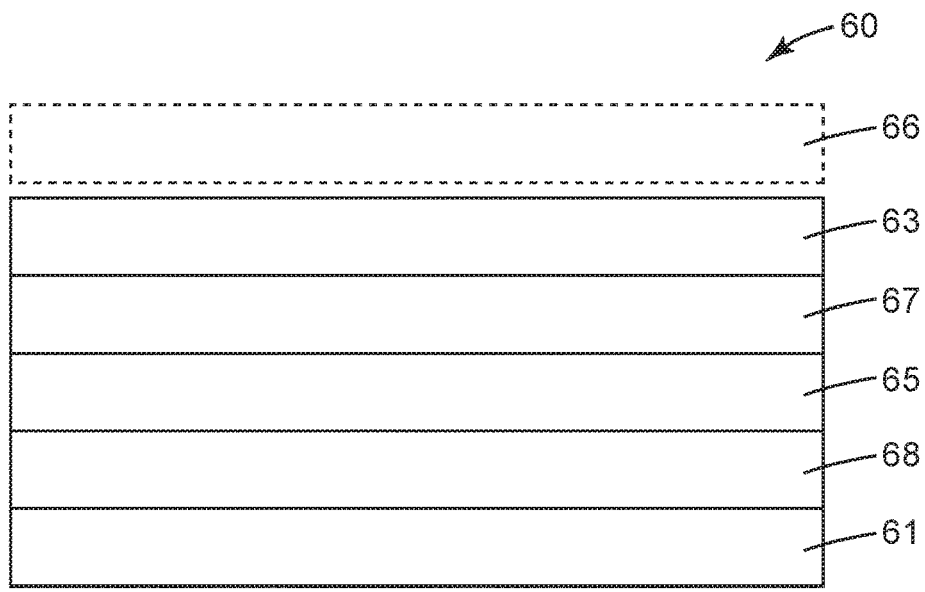
FIG. 6 is a schematic cross-sectional view of an exemplary liquid crystal display cell comprising multi-layer optical film described herein.

Referring to FIG. 6, exemplary liquid crystal display device 60 includes liquid crystal display 61, exemplary multi-layer optical film described herein 63, and IR mirror layer 65, adhesive layers 67, 68, and optional hardcoat layer 66. The multi-layer optical film can be incorporated into liquid crystal display devices using techniques generally known in the art.

Figure 7:
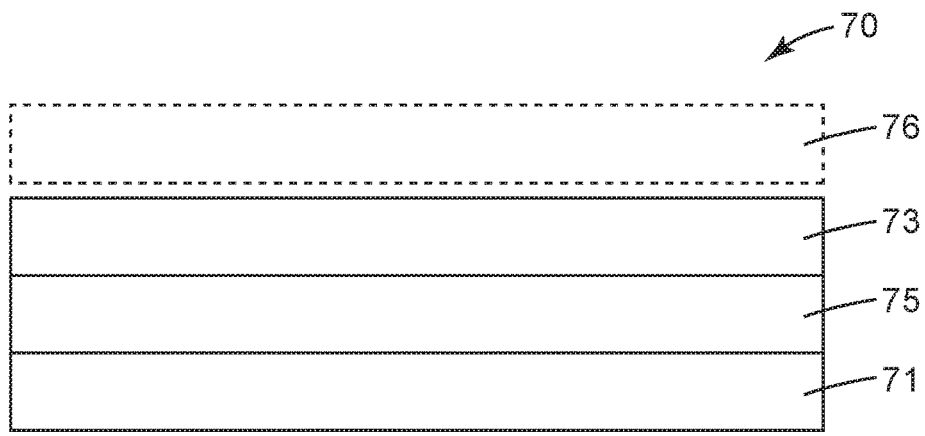
FIG. 7 is a schematic cross-sectional view of an exemplary sign comprising multi-layer optical film described herein.

Referring to FIG. 7, commercial graphic sign 70 includes sign 71, exemplary multi-layer optical film described herein 73, adhesive layer 75, and optional hardcoat layer 76. The multi-layer optical film can be incorporated into commercial graphic signage constructions using techniques generally known in the art.

Figure 8:
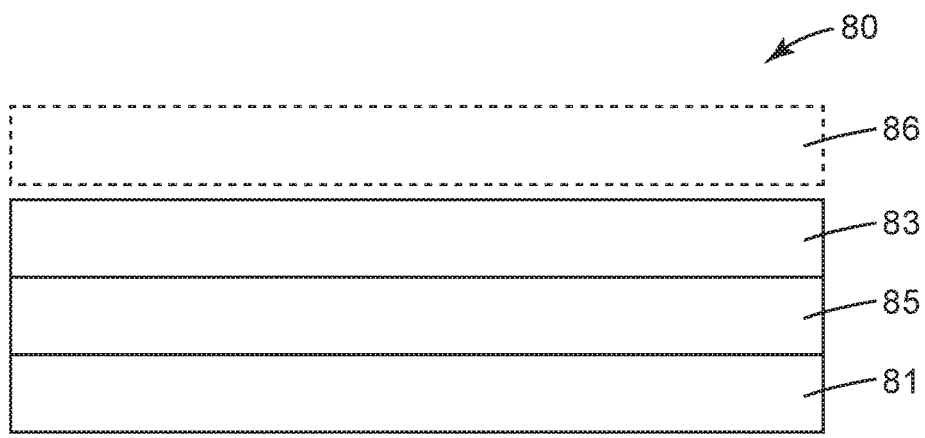
FIG. 8 is a schematic cross-sectional view of an exemplary lighted sign comprising multi-layer optical film described herein.

Referring to FIG. 8, sign 80 includes lighted sign 81, exemplary multi-layer optical film described herein 83, adhesive layer 85, and optional hardcoat layer 86. The multi-layer optical film can be incorporated into lighted signage constructions using techniques generally known in the art.

Figure 9:
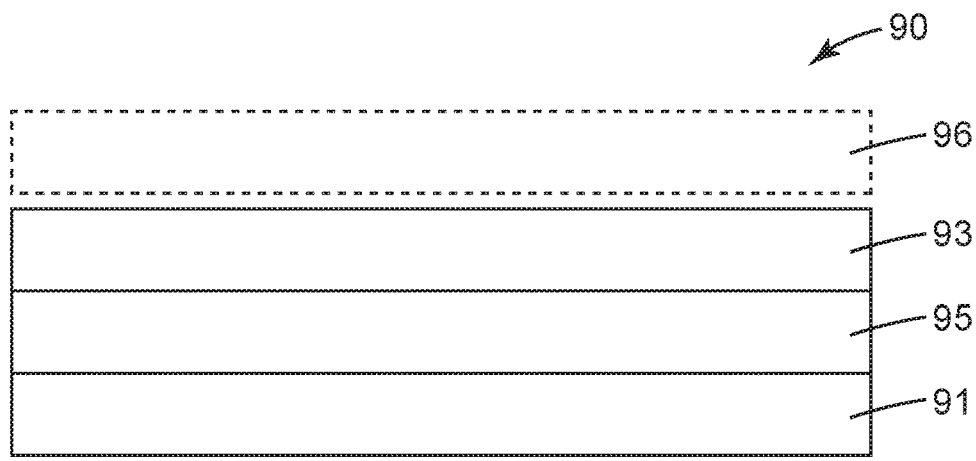
FIGS. 9-11 are schematic cross-sectional views of an exemplary photovoltaic cell comprising multi-layer optical films described herein.
Figure 10:
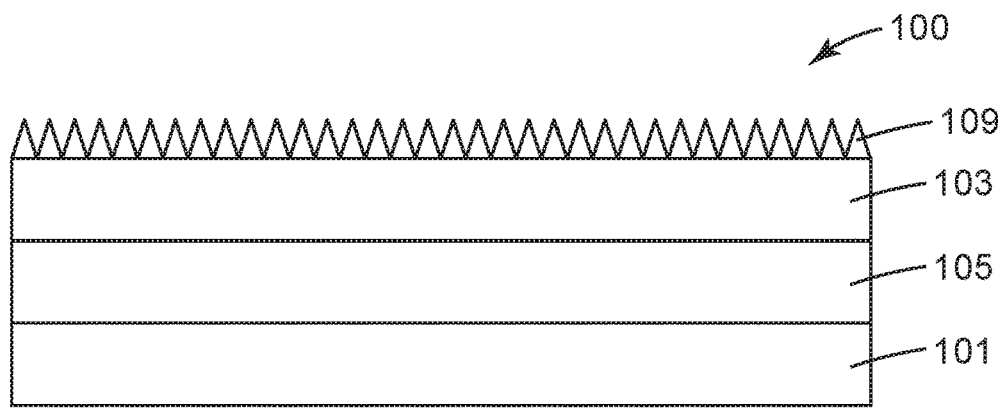
Figure 11:
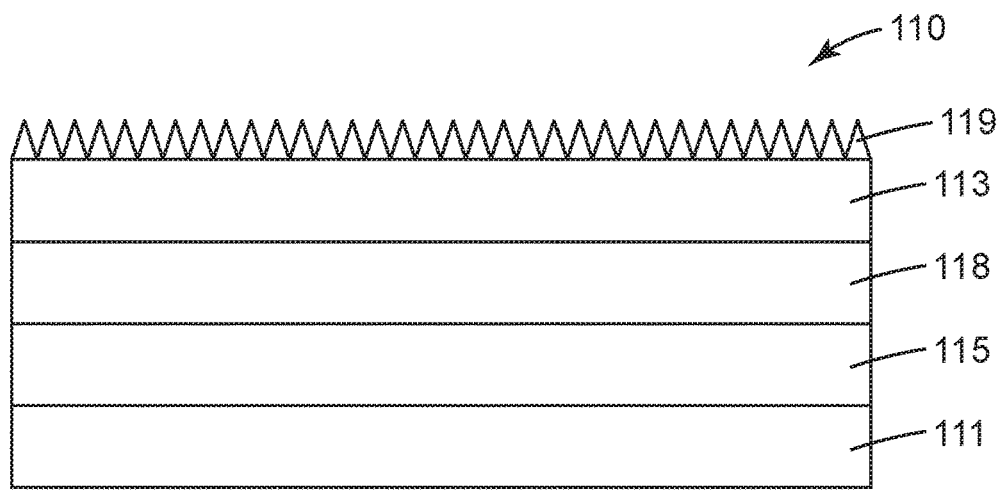

Referring to FIG. 9, photovoltaic module 90 includes photovoltaic module cell 91, exemplary multi-layer optical film described herein 93, adhesive layer 95, and optional hardcoat layer 96. Referring to FIG. 10, photovoltaic module 100 includes photovoltaic module cell 101, exemplary multi-layer optical film described herein 103, adhesive layer 105, and optional antireflective surface structure 109. Referring to FIG. 11, photovoltaic module 110 includes photovoltaic module cell 111, exemplary multi-layer optical film described herein 113, adhesive layer 115, optional vapor barrier layer 118, and optional antireflective surface structure 119. The multi-layer optical film can be incorporated into photovoltaic modules using techniques generally known in the art. Solar energy conversion devices having flat glass or polymer front side layers typically lose 3-5% of available solar energy due to front side surface reflections, and hence preferably include an antireflective surface structure.

Preferably an anti-reflective structured surface layer minimizes surface reflections. Incident solar rays are partially reflected off the sloped surfaces of the structured surface. However, these partially reflected solar rays reflect onto the adjacent surface structure where they are either refracted directly to the solar energy conversion device, or are totally internally reflected to the solar energy conversion device. Almost all of the incident solar rays eventually reach the solar energy conversion device, thus increasing its efficiency.

Exemplary structured layers include those having a structured surface comprising a series of structures. The structured layer may be a single material or may be a multilayer construction, where the structured layer comprises one material formulation, and a base film and adhesive comprise different material formulations. Additionally, the film and adhesive layers could themselves comprise multiple layers. Generally, the structured layer has a structured surface wherein, wherein a substantial portion of reflected light intersects another structure on the surface. In some embodiments, the series of structures comprises a series of essentially parallel peaks separated by a series of essentially parallel valleys. In cross-section the structured layer may assume a variety of wave forms. For example, the cross section may assume a symmetric saw tooth pattern in which each of the peaks are identical as are each of the valleys; a series of parallel peaks that are of different heights, separated by a series of parallel valleys; or a saw tooth pattern of alternating, parallel, asymmetric peaks separated by a series of parallel, asymmetric valleys. In some embodiments, the peaks and valleys are continuous and in other embodiments a discontinuous pattern of peaks and valleys is also contemplated. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

In some embodiments, the structured surface is opposite the energy conversion device, and the structured surface is antireflective. An antireflective, structured surface means, for the purpose of the present application, that reflection, averaged over all angles of incidence, is less than it would be on a corresponding flat surface, for example, is less than 50% of the reflection off the flat surface (in some embodiments less than 60%, 70%, or even less than 80% of the reflection off the flat surface).

The dimensions of the peaks generally have a height of at least about 10 micrometers (0.0004 inch). In some embodiments, peaks have a height up to about 250 micrometers (0.010 inch). In one embodiment, for example, the peaks are at least about 20 micrometers (0.0008 inch) high, and in another exemplary embodiment, the peaks are up to about 150 micrometers (0.006 inch) high. The peak-to-peak spacing between adjacent peaks is generally at least about 10 micrometers (0.0004 inch). In another embodiment, the spacing is up to about 250 micrometers (0.010 inch). In one embodiment, the spacing is at least about 20 micrometers (0.0008 inch), and in some embodiments, the spacing is as much as about 150 micrometers (0.006 inch). The included angle between adjacent peaks can also vary. The valleys may be flat, round, parabolic, or V-shaped. The peaks are generally V-shaped and have an apex angle of less than 60 degrees (in some embodiments less than 50 degrees, or even less than 40 degrees). The present application is also directed to peaks having a radius of curvature at the tip, and such an embodiment has an apex angle measured by the best fit line to the sides.

In some embodiments, the series of structures are non-uniform structures. For example, the structures differ in height, base width, pitch, apex angle, or other structural aspect. In such embodiments, the slope of the structures from the plane of the surface averages over the surface less than 30 degrees from normal. In other embodiments, for example, the structures are substantially symmetric in one dimension around a perpendicular to the surface.

The structured surface can comprise, for example, a structured polyurethane layer. This polyurethane layer can be prepared, for example, from the condensation polymerization of a reaction mixture that comprises a polyol, a polyisocyanate, and a catalyst. The reaction mixture may also contain additional components which are not condensation polymerizable, and generally contains at least one UV stabilizer. As will be described below, the condensation polymerization reaction, or curing, generally is carried out in a mold or tool to generate the structured surface in the cured surface.

For the polyurethane polymers described in this disclosure that are formed from the condensation reaction of a polyol and a polyisocyanate they contain at least polyurethane linkages. The polyurethane polymers formed in this disclosure may contain only polyurethane linkages or they may contain other optional linkages such as polyurea linkages, polyester linkages, polyamide linkages, silicone linkages, acrylic linkages, and the like. As described below, these other optional linkages can appear in the polyurethane polymer because they were present in the polyol or the polyisocyanate materials that are used to form the polyurethane polymer. The polyurethane polymers of this disclosure are not cured by free radical polymerizations. For example, polyurethane oligomeric molecules with vinylic or other free radically polymerizable end groups are known materials, and polymers formed by the free radical polymerization of these molecules are sometimes referred to as "polyurethanes", but such polymers are outside of the scope of this disclosure.

A wide variety of polyols may be used. The term polyol includes hydroxyl-functional materials that generally comprise at least 2 terminal hydroxyl groups and may be generally described by the structure HO—B—OH, where the B group may be an aliphatic group, an aromatic group, or a group containing a combination of aromatic and aliphatic groups, and may contain a variety of linkages or functional groups, including additional terminal hydroxyl groups. Typically the HO—B—OH is a diol or a hydroxyl-capped prepolymer such as a polyurethane, polyester, polyamide, silicone, acrylic, or polyurea prepolymer.

Examples of useful polyols include polyester polyols (such as lactone polyols), polyether polyols (such as polyoxyalkylene polyols), polyalkylene polyols, mixtures thereof, and copolymers therefrom. Polyester polyols are particularly useful. Among the useful polyester polyols are linear and non-linear polyester polyols including those made from polyethylene adipate, polybutylene succinate, polyhexamethylene sebacate, polyhexamethylene dodecanedioate, polyneopentyl adipate, polypropylene adipate, polycyclohexanedimethyl adipate, and poly ε-caprolactone. Particularly useful are aliphatic polyester polyols available from King Industries, Norwalk, Conn., under the trade designation "K-FLEX" (e.g., "K-FLEX 188" and "K-FLEX A308").

Where HO—B—OH is a hydroxyl-capped prepolymer, a wide variety of precursor molecules can be used to produce the desired HO—B—OH prepolymer. For example, the reaction of polyols with less than stoichiometric amounts of diisocyanates can produce a hydroxyl-capped polyurethane prepolymer. Examples of suitable diisocyanates include, for example, aromatic diisocyanates, such as 2,6-toluene diisocyanate, 2, 5-toluene diisocyanate, 2, 4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5, 5'-tetraethyl)-biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethylcyclohexyl isocyanate (isophorone diisocyanate). For reasons of weatherability, generally aliphatic and cycloaliphatic diisocyanates are used.

An example of the synthesis of a HO—B—OH prepolymer is shown in Reaction Scheme 1 (where (CO) represents a carbonyl group C=O) below:

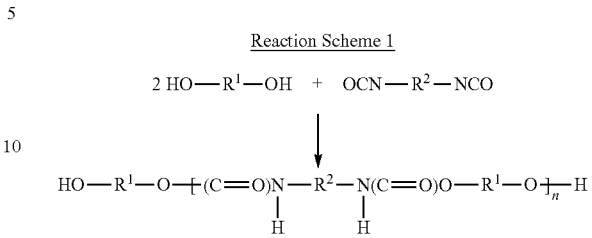

Reaction Scheme 1

$$2\text{ HO}-R^1-\text{OH} + \text{OCN}-R^2-\text{NCO}$$

$$\downarrow$$

$$\text{HO}-R^1-\text{O}\!-\!\!\!+\!(C\!\!=\!\!O)\underset{H}{N}-R^2-\underset{H}{N}(C\!\!=\!\!O)O-R^1-O\!\!+\!\!\!\!-_n\!H$$

where n is one or greater, depending upon the ratio of polyol to diisocyanate, for example, when the ratio is 2:1, n is 1. Similar reactions between polyols and dicarboxylic acids or dianhydrides can give HO—B—OH prepolymers with ester linking groups.

Polyols with more than two hydroxyl groups per molecule will lead to a crosslinked resin upon reaction with di or higher functionality isocyanates. Crosslinking prevents creep of the formed polymer, and helps maintain the desired structure. Typically the polyol is an aliphatic polyester polyol such as those available from King Industries, Norwalk, Conn., under the trade designation "K-FLEX" (e.g., "K-FLEX 188" and "K-FLEX A308").

A wide variety of polyisocyanates may be used. The term polyisocyanate includes isocyanate-functional materials that generally comprise at least 2 terminal isocyanate groups, such as diisocyanates that may be generally described by the structure OCN—ZNCO, where the Z group may be an aliphatic group, an aromatic group, or a group containing a combination of aromatic and aliphatic groups. Examples of suitable diisocyanates include, for example, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5, 5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate). For reasons of weatherability, generally aliphatic and cycloaliphatic diisocyanates are used. Some degree of crosslinking is useful in maintaining the desired structured surface. One approach is to use polyisocyanates with a higher functionality than 2.0. One particularly suitable aliphatic polyisocyanate is available under the trade designation "DESMODUR N3300A" from Bayer, Pittsburgh, Pa.

Typically the structured polyurethane layer is of a sufficient size to produce the desired optical effect. The polyurethane layer is generally no more than 10 millimeters thick, typically much thinner. For economical reasons, it is generally desirable to use a structured polyurethane layer which is as thin as possible. It may be desirable to maximize the amount of polyurethane material which is contained in the structures and to minimize the amount of polyurethane material that forms the base of the structured polyurethane layer but is not structured. In some instances this base portion is sometimes referred to as "the land" as it is analogous to the land from which mountains arise.

The aliphatic polyurethanes show good stability to ultraviolet weathering, but the addition of UV stabilizers can further improve their stability when exposed to the environment. Examples of suitable UV stabilizers include ultraviolet absorbers (UVAs), Hindered Amine Light Stabilizers (HALS), and antioxidants. It has been found useful to choose additives that are soluble in the reactive mixture, especially in the polyol. Benzotriazole UVAs (available, for example, under the trade designations "TINUVIN P 213," "TINUVIN P 234," "TINUVIN P 326," "TINUVIN P 327," "TINUVIN P 328," and "TINUVIN P 571" from Ciba, Tarrytown, N.Y.); hydroxylphenyl triazines such as (available, for example, under the trade designations "TINUVIN 400" and "TINUVIN 405" from Ciba); HALS (available, for example, under the trade designations "TINUVIN 123," "TINUVIN 144," "TINUVIN 622," "TINUVIN 765," and "TINUVIN 770" from Ciba); and the antioxidants (available, for example, under the trade designations "IRGANOX 1010," "IRGANOX 1135," and "IRGANOX 1076" from Ciba). The material available under the trade designation "TINUVIN B75," a product containing UVA, HALS and antioxidant available from Ciba is also suitable.

The reactive mixture used to form the structured polyurethane layer may also contain additional additives if desired, as long as the additive does not interfere with the urethane polymerization reaction or adversely affect the optical properties of the formed structured polyurethane layer. Additives may be added to aid the mixing, processing, or coating of the reactive mixture or to aid the final properties of the formed structured polyurethane layer. Examples of additives include: particles, including nanoparticles or larger particles; mold release agents; low surface energy agents; antimildew agents; antifungal agents; antifoaming agents; antistatic agents; and coupling agents such as amino silanes and isocyanato silanes. Combinations of additives can also be used.

In some embodiments, the structured layer has a variable crosslink density throughout the thickness of the layer. For example, there may be a higher crosslink density at the surface of the structured layer. The crosslink density may be increased at the surface of the structured surface film using electron beam irradiation at relatively low voltage such as 100 kV to 150 kV.

In some embodiments, for example, the polyol and polyisocyanate reaction may proceed without a catalyst, and the crosslinking accelerated by free radicals formed via electron beam irradiation. This may be advantageous, in that the catalysts may contribute to oxidative and photo-degradation of the polyurethane polymer. In another embodiment, the reactive mixture is polymerized with the above preferred catalysts, and then further cross-linked with electron beam irradiation. Higher cross-link densities achieved with electron beam irradiation may increase the durability of the polyurethane, especially to abrasion such as from falling sand. Electron beam irradiation can be controlled to provide higher cross-link density at the surface of the polyurethane structured surface than in the bulk of the polyurethane article. High cross-link density has the desirable effect of minimizing transmission losses from abrasion. For example, exposure of surface structured aliphatic polyurethanes to 30 megarads dosage at 120 kV decreases transmission losses to less than 3%. Transmission increases of 4-5% have been measured with the exemplified surface structures over flat glass surfaces before abrasion. Since the demonstrated benefit of the surface structure is to provide higher transmission than flat glass, it is desirable to have transmission losses no greater than 3% from abrasion. Exemplary highly cross-linked surface structured polyurethanes of this invention maintain higher transmission than flat glass after abrasion from falling sand.

Barrier layers useful for practicing the present disclosure can be selected from a variety of constructions. Barrier layers are typically selected such that they have oxygen and water transmission rates at a specified level as required by the application. In some embodiments, the barrier layer has a water vapor transmission rate (WVTR) less than about 0.005 g/m$^2$/day at 38° C. and 100% relative humidity; in some embodiments, less than about 0.0005 g/m$^2$/day at 38° C. and 100% relative humidity; and in some embodiments, less than about 0.00005 g/m$^2$/day at 38° C. and 100% relative humidity. In some embodiments, the flexible barrier layer has a WVTR of less than about 0.05, 0.005, 0.0005, or 0.00005 g/m$^2$/day at 50° C. and 100% relative humidity or even less than about 0.005, 0.0005, 0.00005 g/m$^2$/day at 85° C. and 100% relative humidity. In some embodiments, the barrier layer has an oxygen transmission rate of less than about 0.005 g/m$^2$/day at 23° C. and 90% relative humidity; in some embodiments, less than about 0.0005 g/m$^2$/day at 23° C. and 90% relative humidity; and in some embodiments, less than about 0.00005 g/m$^2$/day at 23° C. and 90% relative humidity.

Exemplary useful barrier layers include inorganic films prepared by atomic layer deposition, thermal evaporation, sputtering, and chemical vapor deposition. Useful barrier layers are typically flexible and transparent.

In some embodiments, useful barrier layers comprise inorganic/organic multilayers. Flexible ultra-barrier layers comprising inorganic/organic multilayers are described, for example, in U.S. Pat. No. 7,018,713 (Padiyath et al.). Such flexible ultra-barrier layers may have a first polymer layer disposed on a polymeric film substrate that is overcoated with two or more inorganic barrier layers separated by at least one second polymer layer. In some embodiments, the barrier layer comprises one inorganic barrier layer interposed between the first polymer layer disposed on the polymeric film substrate and a second polymer layer.

The first and second polymer layers can independently be formed by applying a layer of a monomer or oligomer and crosslinking the layer to form the polymer in situ, for example, by flash evaporation and vapor deposition of a radiation-crosslinkable monomer followed by crosslinking, for example, using an electron beam apparatus, UV light source, electrical discharge apparatus or other suitable device. The first polymer layer is applied to the polymeric film substrate, and the second polymer layer is typically applied to the inorganic barrier layer. The materials and methods useful for forming the first and second polymer layers may be independently selected to be the same or different. Useful techniques for flash evaporation and vapor deposition followed by crosslinking in situ can be found, for example, in U.S. Pat. No. 4,696,719 (Bischoff), U.S. Pat. No. 4,722,515 (Ham), U.S. Pat. No. 4,842,893 (Yializis et al.), U.S. Pat. No. 4,954,371 (Yializis), U.S. Pat. No. 5,018,048 (Shaw et al.), U.S. Pat. No. 5,032,461 (Shaw et al.), U.S. Pat. No. 5,097,800 (Shaw et al.), U.S. Pat. No. 5,125,138 (Shaw et al.), U.S. Pat. No. 5,440,446 (Shaw et al.), U.S. Pat. No. 5,547,908 (Furuzawa et al.), U.S. Pat. No. 6,045,864 (Lyons et al.), U.S. Pat. No. 6,231,939 (Shaw et al.), and U.S. Pat. No. 6,214,422 (Yializis); in published PCT Application No. WO 00/26973 (Delta V Technologies, Inc.); in D. G. Shaw and M. G. Langlois, "A New Vapor Deposition Process for Coating Paper and Polymer Webs", 6th International Vacuum Coating Conference (1992); in D. G. Shaw and M. G. Langlois, "A New High Speed Process for Vapor Depositing Acrylate Thin Films: An Update", Society of Vacuum Coaters 36th Annual Technical Conference Proceedings (1993); in D. G. Shaw and M. G. Langlois, "Use of Vapor Deposited Acrylate Coatings to Improve the Barrier Properties of Metallized Film", Society of Vacuum Coaters 37th Annual Technical Conference Proceedings (1994); in D. G. Shaw, M. Roehrig, M. G. Langlois and C. Sheehan, "Use of Evaporated Acrylate Coatings to Smooth the Surface of Polyester and Polypropylene Film Substrates", RadTech (1996); in J. Affinito, P. Martin, M. Gross, C. Coronado and E. Greenwell, "Vacuum deposited polymer/metal multilayer films for optical application", Thin Solid Films 270, 43-48 (1995); and in J. D. Affinito, M. E. Gross, C. A. Coronado, G. L. Graff, E. N. Greenwell and P. M. Martin, "Polymer-Oxide Transparent Barrier Layers", Society of Vacuum Coaters 39th Annual Technical Conference Proceedings (1996). In some embodiments, the polymer layers and inorganic barrier layer are sequentially deposited in a single pass vacuum coating operation with no interruption to the coating process.

The coating efficiency of the first polymer layer can be improved, for example, by cooling the polymeric film substrate. Similar techniques can also be used to improve the coating efficiency of the second polymer layer. The monomer or oligomer useful for forming the first and/or second polymer layers can also be applied using conventional coating methods such as roll coating (e.g., gravure roll coating) or spray coating (e.g., example, electrostatic spray coating). The first and/second polymer layers can also be formed by applying a layer containing an oligomer or polymer in solvent and then removing the solvent using conventional techniques (e.g., at least one of heat or vacuum). Plasma polymerization may also be employed.

Volatilizable acrylate and methacrylate monomers are useful for forming the first and second polymer layers. In some embodiments, volatilizable acrylates are used. Volatilizable acrylate and methacrylate monomers may have a molecular weight in the range from about 150 grams per mole to about 600 grams per mole, or, in some embodiments, from about 200 grams per mole to about 400 grams per mole. In some embodiments, volatilizable acrylate and methacrylate monomers have a value of the ratio of the molecular weight to the number of (meth)acrylate functional groups per molecule in the range from about 150 grams per mole to about 600 g/mole/(meth)acrylate group, in some embodiments, from about 200 grams per mole to about 400 g/mole/(meth)acrylate group. Fluorinated acrylates and methacrylates can be used at higher molecular weight ranges or ratios, for example, about 400 grams per mole to about 3000 molecular weight or about 400 to about 3000 g/mole/ (meth)acrylate group. Exemplary useful volatilizable acrylates and methacrylates include hexanediol diacrylate, ethoxyethyl acrylate, phenoxyethyl acrylate, cyanoethyl (mono)acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth)acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol-propane triacrylate, propylated trimethylolpropane triacrylate, tris(2-hydroxyethyl) isocyanurate triacrylate, pentaerythritol triacrylate, phenylthioethyl acrylate, naphthyloxyethyl acrylate, cyclic diacrylates (e.g., available under the trade designation "EB-130" from Cytec Industries Inc.) and tricyclodecane dimethanol diacrylate (e.g., available under the trade designation SR833S" from Sartomer Co.), epoxy acrylate (e.g., available under the trade designation "RDX80095" from Cytec Industries Inc.), and mixtures thereof.

Useful monomers for forming the first and second polymer layers are available from a variety of commercial sources and include urethane acrylates (e.g., available from Sartomer Co., Exton, Pa. under the trade designations "CN-968" and "CN-983"), isobornyl acrylate (e.g., available from Sartomer Co. under the trade designation "SR-506"), dipentaerythritol pentaacrylates (e.g., available from Sartomer Co. under the trade designation "SR-399"), epoxy acrylates blended with styrene (e.g., available from Sartomer Co. under the trade designation "CN-120S80"), di-trimethylolpropane tetraacrylates (e.g., available from Sartomer Co. under the trade designation "SR-355"), diethylene glycol diacrylates (e.g., available from Sartomer Co. under the trade designation "SR-230"), 1,3-butylene glycol diacrylate (e.g., available from Sartomer Co. under the trade designation "SR-212"), pentaacrylate esters (e.g., available from Sartomer Co. under the trade designation "SR-9041"), pentaerythritol tetraacrylates (e.g., available from Sartomer Co. under the trade designation "SR-295"), pentaerythritol triacrylates (e.g., available from Sartomer Co. under the trade designation "SR-444"), ethoxylated (3) trimethylolpropane triacrylates (e.g., available from Sartomer Co. under the trade designation "SR-454"), ethoxylated (3) trimethylolpropane triacrylates (e.g., available from Sartomer Co. under the trade designation "SR-454HP"), alkoxylated trifunctional acrylate esters (e.g., available from Sartomer Co. under the trade designation "SR-9008"), dipropylene glycol diacrylates (e.g., available from Sartomer Co. under the trade designation "SR-508"), neopentyl glycol diacrylates (e.g., available from Sartomer Co. under the trade designation "SR-247"), ethoxylated (4) bisphenol a dimethacrylates (e.g., available from Sartomer Co. under the trade designation "CD-450"), cyclohexane dimethanol diacrylate esters (e.g., available from Sartomer Co. under the trade designation "CD-406"), isobornyl methacrylate (e.g., available from Sartomer Co. under the trade designation "SR-423"), cyclic diacrylates (e.g., available from UCB Chemical, Smyrna, Ga., under the trade designation "IRR-214") and tris (2-hydroxy ethyl) isocyanurate triacrylate (e.g., available from Sartomer Co. under the trade designation "SR-368"), acrylates of the foregoing methacrylates and methacrylates of the foregoing acrylates.

Other monomers that are useful for forming the first and/or second polymer layers include vinyl ethers, vinyl naphthalene, acrylonitrile, and mixtures thereof.

The desired chemical composition and thickness of the first polymer layer will depend in part on the nature and surface topography of the polymeric film substrate. The thickness of the first and/or second polymer layers will typically be sufficient to provide a smooth, defect-free surface to which inorganic barrier layer can be applied subsequently. For example, the first polymer layer may have a thickness of a few nm (e.g., 2 nm or 3 nm) to about 5 micrometers or more. The thickness of the second polymer layer may also be in this range and may, in some embodiments, be thinner than the first polymer layer.

Visible light-transmissive inorganic barrier layer can be formed from a variety of materials. Useful materials include metals, metal oxides, metal nitrides, metal carbides, metal oxynitrides, metal oxyborides, and combinations thereof. Exemplary metal oxides include silicon oxides such as silica, aluminum oxides such as alumina, titanium oxides such as titania, indium oxides, tin oxides, indium tin oxide (ITO), tantalum oxide, zirconium oxide, niobium oxide, and combinations thereof. Other exemplary materials include boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof. In some embodiments, the visible light-transmissive inorganic barrier layer comprises at least one of ITO, silicon oxide, or aluminum oxide. In some embodiments, with the proper selection of the relative proportions of each elemental constituent, ITO can be electrically conductive. The inorganic barrier layers can be formed, for example, using techniques employed in the film metallizing art such as sputtering (for example, cathode or planar magnetron sputtering, dual AC planar magnetron sputtering or dual AC rotatable magnetron sputtering), evaporation (e.g., resistive or electron beam evaporation and energy enhanced analogs of resistive or electron beam evaporation including ion beam and plasma assisted deposition), chemical vapor deposition, plasma-enhanced chemical vapor deposition, and plating. In some embodiments, the inorganic barrier layers are formed using sputtering (e.g., reactive sputtering. Enhanced barrier properties may be observed when the inorganic layer is formed by a high energy deposition technique such as sputtering compared to lower energy techniques such as conventional vapor deposition processes. Without being bound by theory, it is believed that the enhanced properties are due to the condensing species arriving at the substrate with greater kinetic energy, leading to a lower void fraction as a result of compaction.

The desired chemical composition and thickness of each inorganic barrier layer will depend in part on the nature and surface topography of the underlying layer and on the desired optical properties for the barrier layer. The inorganic barrier layers typically are sufficiently thick so as to be continuous, and sufficiently thin so as to ensure that the barrier layers and assemblies disclosed herein will have the desired degree of visible light transmission and flexibility. The physical thickness (as opposed to the optical thickness) of each inorganic barrier layer may be, for example, about 3 nm to about 150 nm (in some embodiments, about 4 nm to about 75 nm). The term "visible light-transmissive" as used herein to described the inorganic barrier layer can mean having an average transmission over the visible portion of the spectrum of at least about 75 (in some embodiments, at least about 80, 85, 90, 92, 95, 97, or 98) percent measured along the normal axis. In some embodiments, the inorganic barrier layer has an average transmission over a range of 400 nm to 1400 nm of at least about 75 (in some embodiments, at least about 80, 85, 90, 92, 95, 97, or 98) percent. Visible light-transmissive inorganic barrier layers are those that do not interfere with absorption of visible light, for example, by photovoltaic cells.

Additional inorganic barrier layers and polymer layers can be present if desired. In embodiments wherein more than one inorganic barrier layer is present, the inorganic barrier layers do not have to be the same or have the same thickness. When more than one inorganic barrier layer is present, the inorganic barrier layers can respectively be referred to as the "first inorganic barrier layer" and "second inorganic barrier layer". Additional "polymer layers" may be present in between additional inorganic barrier layers. For example, the barrier layer may have several alternating inorganic barrier layers and polymer layers. Each unit of inorganic barrier layer combined with a polymer layer is referred to as a dyad, and the barrier layer can include any number of dyads. It can also include various types of optional layers between the dyads.

Surface treatments or tie layers can be applied between any of the polymer layers or inorganic barrier layers, for example, to improve smoothness or adhesion. Useful surface treatments include electrical discharge in the presence of a suitable reactive or non-reactive atmosphere (e.g., plasma, glow discharge, corona discharge, dielectric barrier discharge, or atmospheric pressure discharge); chemical pretreatment; or flame pretreatment. A separate adhesion promotion layer may also be formed between the major surface of the polymeric film substrate and the barrier layer. The adhesion promotion layer can be, for example, a separate polymeric layer or a metal-containing layer such as a layer of metal, metal oxide, metal nitride or metal oxynitride. The adhesion promotion layer may have a thickness of a few nanometers (nm) (e.g., 1 nm or 2 nm) to about 50 nm or more.

In some embodiments, useful barrier layers comprise plasma deposited polymer layers (e.g., diamond-like layers) such as those disclosed in U.S. Pat. App. Pub. No. 2007-0020451 (Padiyath et al.). For example, barrier layers can be made by overcoating a first polymer layer on the flexible visible-light transmissive substrate, and a plasma deposited polymer layer overcoated on the first polymer layer. The first polymer layer may be as described in any of the above embodiments of the first polymer layer. The plasma deposited polymer layer may be, for example, a diamond-like carbon layer or a diamond-like glass. The term "overcoated" to describe the position of a layer with respect to a substrate or other element of a barrier layer, refers to the layer as being atop the substrate or other element, but not necessarily contiguous to either the substrate or the other element. The term "diamond-like glass" (DLG) refers to substantially or completely amorphous glass including carbon and silicon, and optionally including one or more additional components selected from the group including hydrogen, nitrogen, oxygen, fluorine, sulfur, titanium, and copper. Other elements may be present in certain embodiments. The amorphous diamond-like glass films may contain clustering of atoms to give it a short-range order but are essentially devoid of medium and long range ordering that lead to micro or macro crystallinity, which can adversely scatter radiation having wavelengths of from 180 nm to 800 nm. The term "diamond-like carbon" (DLC) refers to an amorphous film or coating comprising approximately 50 to 90 atomic percent carbon and approximately 10 to 50 atomic percent hydrogen, with a gram atom density of between approximately 0.20 and approximately 0.28 gram atoms per cubic centimeter, and composed of approximately 50% to approximately 90% tetrahedral bonds.

In some embodiments, the barrier layer can have multiple layers made from alternating DLG or DLC layers and polymer layers (e.g., first and second polymer layers as described above) overcoated on the flexible, visible-light transmissive substrate. Each unit including a combination of a polymer layer and a DLG or DLC layer is referred to as a dyad, and the assembly can include any number of dyads. It can also include various types of optional layers between the dyads. Adding more layers in the barrier layer may increase its imperviousness to oxygen, moisture, or other contaminants and may also help cover or encapsulate defects within the layers.

In some embodiments, the diamond-like glass comprises, on a hydrogen-free basis, at least 30% carbon, a substantial amount of silicon (typically at least 25%) and no more than 45% oxygen. The unique combination of a fairly high amount of silicon with a significant amount of oxygen and a substantial amount of carbon makes these films highly transparent and flexible. Diamond-like glass thin films may have a variety of light transmissive properties. Depending upon the composition, the thin films may have increased transmissive properties at various frequencies. However, in some embodiments, the thin film (when approximately one micron thick) is at least 70% transmissive to radiation at substantially all wavelengths from about 250 nm to about 800 nm (e.g., 400 nm to about 800 nm). A transmission of 70% for a one micron thick film corresponds to an extinction coefficient (k) of less than 0.02 in the visible wavelength range between 400 nm and 800 nm.

In creating a diamond-like glass film, various additional components can be incorporated to alter and enhance the properties that the diamond-like glass film imparts to the substrate (for example, barrier and surface properties). The additional components may include one or more of hydrogen, nitrogen, fluorine, sulfur, titanium, or copper. Other additional components may also be of benefit. The addition of hydrogen promotes the formation of tetrahedral bonds. The addition of fluorine may enhance barrier and surface properties of the diamond-like glass film, including the ability to be dispersed in an incompatible matrix. Sources of fluorine include compounds such as carbon tetrafluoride (CF4), sulfur hexafluoride (SF6), C2F6, C3F8, and C4F10. The addition of nitrogen may be used to enhance resistance to oxidation and to increase electrical conductivity. Sources of nitrogen include nitrogen gas (N2), ammonia (NH3), and hydrazine (N2H6). The addition of sulfur can enhance adhesion. The addition of titanium tends to enhance adhesion and diffusion and barrier properties.

Various additives to the DLC film can be used. In addition to nitrogen or fluorine, which may be added for the reasons described above with regard to diamond-like glass, oxygen and silicon may be added. The addition of silicon and oxygen to the DLC coating tend to improve the optical transparency and thermal stability of the coating. Sources of oxygen include oxygen gas (O2), water vapor, ethanol, and hydrogen peroxide. Sources of silicon preferably include silanes such as SiH4, Si2H6, and hexamethyldisiloxane.

Additives to DLG or DLC films described above may be incorporated into the diamond-like matrix or attached to the surface atomic layer. If the additives are incorporated into the diamond-like matrix they may cause perturbations in the density and/or structure, but the resulting material is essentially a densely packed network with diamond-like carbon characteristics (e.g., chemical inertness, hardness, and barrier properties). If the additive concentration is too large (e.g., greater than 50 atomic percent relative to the carbon concentration) the density will be affected and the beneficial properties of the diamond-like carbon network will be lost. If the additives are attached to the surface atomic layers they will alter only the surface structure and properties. The bulk properties of the diamond-like carbon network will be preserved.

Plasma deposited polymers such as diamond-like glass and diamond-like carbon can be synthesized from a plasma by using precursor monomers in the gas phase at low temperatures. Precursor molecules are broken down by energetic electrons present in the plasma to form free radical species. These free radical species react at the substrate surface and lead to polymeric thin film growth. Due to the non-specificity of the reaction processes in both the gas phase and the substrate, the resulting polymer films are typically highly cross-linked and amorphous in nature. For additional information regarding plasma deposited polymers, see, for example, H. Yasuda, "Plasma Polymerization," Academic Press Inc., New York (1985); R. d'Agostino (Ed), "Plasma Deposition, Treatment & Etching of Polymers," Academic Press, New York (1990); and H. Biederman and Y. Osada, "Plasma Polymerization Processes," Elsever, New York (1992).

Typically, plasma deposited polymer layers described herein have an organic nature due to the presence of hydrocarbon and carbonaceous functional groups such as CH3, CH2, CH, Si—C, Si—CH3, Al—C, Si—O—CH3, etc. The plasma deposited polymer layers are substantially sub-stoichiometric in their inorganic component and substantially carbon-rich. In films containing silicon, for example, the oxygen to silicon ratio is typically below 1.8 (silicon dioxide has a ratio of 2.0), more typically below 1.5 for DLG, and the carbon content is at least about 10%. In some embodiments, the carbon content is at least about 20% or 25%.

Amorphous diamond-like films formed via ion enhanced plasma chemical vapor deposition (PECVD) utilizing silicone oil and an optional silane source to form the plasma as described, for example, in U.S. Pat. App. Pub. No. 2008-0196664 (David et al.), can also be useful in barrier layers. The terms "silicone", "silicone oil", or "siloxanes" are used interchangeably and refer to oligomeric and higher molecular weight molecules having a structural unit R2SiO in which R is independently selected from hydrogen, (C1-C8) alkyl, (C5-C18)aryl, (C6-C26)arylalkyl, or (C6-C26)alkylaryl. These can also be referred to as polyorganosiloxanes and include chains of alternating silicon and oxygen atoms (—O—Si—O—Si—O—) with the free valences of the silicon atoms joined usually to R groups, but may also be joined (crosslinked) to oxygen atoms and silicon atoms of a second chain, forming an extended network (high MW). In some embodiments, a siloxane source such as vaporized silicone oil is introduced in quantities such that the resulting plasma formed coatings are flexible and have high optical transmission. Any additional useful process gases, such as oxygen, nitrogen and/or ammonia, for example, can be used with the siloxane and optional silane to assist in maintaining the plasma and to modify the properties of the amorphous diamond-like film layers.

In some embodiments, combinations of two or more different plasma deposited polymers can be used. For example, different plasma deposited polymer layers formed by changing or pulsing the process gases that form the plasma for depositing the polymer layer. In another example, a first layer of a first amorphous diamond-like film can be formed and then a second layer of a second amorphous diamond-like film can be formed on the first layer, where the first layer has a different composition than the second layer. In some embodiments, a first amorphous diamond-like film layer is formed from a silicone oil plasma and then a second amorphous diamond-like film layer is formed from a silicone oil and silane plasma. In other embodiments, two or more amorphous diamond-like films layers of alternating composition are formed to create the amorphous diamond-like film.

Plasma deposited polymers such as diamond-like glass and diamond-like carbon can be any useful thickness. In some embodiments, the plasma deposited polymer can have a thickness of at least 500 Angstroms, or at least 1,000 Angstroms. In some embodiments, the plasma deposited polymer can have a thickness in a range from 1,000 Angstroms to 50,000 Angstroms, from 1,000 Angstroms to 25,000 Angstroms, or from 1,000 Angstroms to 10,000 Angstroms.

Other plasma deposition processes for preparing useful barrier layers 120 such as carbon-rich films, silicon-containing films, or combinations thereof are disclosed, for example, in U.S. Pat. No. 6,348,237 (Kohler et al.). Carbon-rich films may contain at least 50 atom percent carbon, and typically about 70-95 atom percent carbon, 0.1-20 atom percent nitrogen, 0.1-15 atom percent oxygen, and 0.1-40 atom percent hydrogen. Such carbon-rich films can be classified as "amorphous", "hydrogenated amorphous", "graphitic", "i-carbon", or "diamond-like", depending on their physical and chemical properties. Silicon-containing films are usually polymeric and contain in random composition silicon, carbon, hydrogen, oxygen, and nitrogen.

Carbon-rich films and silicon-containing films can be formed by means of plasma interaction with a vaporized organic material, which is normally a liquid at ambient temperature and pressure. The vaporized organic material is typically capable of condensing in a vacuum of less than about 1 Torr (130 Pa). The vapors are directed toward the flexible, visible-light transmissive substrate in a vacuum (e.g., in a conventional vacuum chamber) at a negatively charged electrode as described above for plasma polymer deposition. A plasma (e.g., an argon plasma or a carbon-rich plasma as described in U.S. Pat. No. 5,464,667 (Kohler et al.)) and at least one vaporized organic material are allowed to interact during formation of a film. The plasma is one that is capable of activating the vaporized organic material. The plasma and vaporized organic material can interact either on the surface of the substrate or before contacting the surface of the substrate. Either way, the interaction of the vaporized organic material and the plasma provides a reactive form of the organic material (e.g., loss of methyl group from silicone) to enable densification of the material upon formation of the film, as a result of polymerization and/or crosslinking, for example. Significantly, the films are prepared without the need for solvents.

The formed films can be uniform multi-component films (e.g., one layer coatings produced from multiple starting materials), uniform one-component films, and/or multilayer films (e.g., alternating layers of carbon-rich material and silicone materials). For example, using a carbon-rich plasma in one stream from a first source and a vaporized high molecular weight organic liquid such as dimethylsiloxane oil in another stream from a second source, a one-pass deposition procedure may result in a multilayer construction of the film (e.g., a layer of a carbon-rich material, a layer of dimethylsiloxane that is at least partially polymerized, and an intermediate or interfacial layer of a carbon/dimethylsiloxane composite). Variations in system arrangements result in the controlled formation of uniform multi-component films or layered films with gradual or abrupt changes in properties and composition as desired. Uniform coatings of one material can also be formed from a carrier gas plasma (e.g., argon), and a vaporized high molecular weight organic liquid (e.g., dimethylsiloxane oil).

Other useful barrier layers comprise films having a graded-composition barrier coating such as those described in U.S. Pat. No. 7,015,640 (Schaepkens et al.). Films having a graded-composition barrier coating can be made by depositing reaction or recombination products of reacting species onto polymeric film substrate. Varying the relative supply rates or changing the identities of the reacting species results in a coating that has a graded composition across its thickness. Suitable coating compositions are organic, inorganic, or ceramic materials. These materials are typically reaction or recombination products of reacting plasma species and are deposited onto the substrate surface. Organic coating materials typically comprise carbon, hydrogen, oxygen, and optionally other minor elements, such as sulfur, nitrogen, silicon, etc., depending on the types of reactants. Suitable reactants that result in organic compositions in the coating are straight or branched alkanes, alkenes, alkynes, alcohols, aldehydes, ethers, alkylene oxides, aromatics, etc., having up to 15 carbon atoms. Inorganic and ceramic coating materials typically comprise oxide; nitride; carbide; boride; or combinations thereof of elements of Groups IIA, IIIA, IVA, VA, VIA, VIIA, IB, and IIB; metals of Groups IIIB, IVB, and VB; and rare-earth metals. For example, silicon carbide can be deposited onto a substrate by recombination of plasmas generated from silane (SiH4) and an organic material, such as methane or xylene. Silicon oxycarbide can be deposited from plasmas generated from silane, methane, and oxygen or silane and propylene oxide. Silicon oxycarbide also can be deposited from plasmas generated from organosilicone precursors, such as tetraethoxysilane (TEOS), hexamethyldisiloxane (HMDSO), hexamethyldisilazane (HMDSN), or octamethylcyclotetrasiloxane (D4). Silicon nitride can be deposited from plasmas generated from silane and ammonia. Aluminum oxycarbonitride can be deposited from a plasma generated from a mixture of aluminum tartrate and ammonia. Other combinations of reactants may be chosen to obtain a desired coating composition. The choice of the particular reactants is within the skills of the artisans. A graded composition of the coating can be obtained by changing the compositions of the reactants fed into the reactor chamber during the deposition of reaction products to form the coating or by using overlapping deposition zones, for example, in a web process. The coating may be formed by one of many deposition techniques, such as plasma-enhanced chemical-vapor deposition (PECVD), radio-frequency plasma-enhanced chemical-vapor deposition (RFPECVD), expanding thermal-plasma chemical-vapor deposition (ETPCVD), sputtering including reactive sputtering, electron-cyclotron-resonance plasma-enhanced chemical-vapor deposition (ECRPECVD), inductively coupled plasma-enhanced chemical-vapor deposition (ICPECVD), or combinations thereof. Coating thickness is typically in the range from about 10 nm to about 10000 nm, in some embodiments from about 10 nm to about 1000 nm, and in some embodiments from about 10 nm to about 200 nm. The barrier layer can have an average transmission over the visible portion of the spectrum of at least about 75 (in some embodiments, at least about 80, 85, 90, 92, 95, 97, or 98) percent measured along the normal axis. In some embodiments, the barrier layer has an average transmission over a range of 400 nm to 1400 nm of at least about 75 (in some embodiments, at least about 80, 85, 90, 92, 95, 97, or 98) percent.

Other suitable barrier layers include thin and flexible glass laminated on a polymer film, and glass deposited on a polymeric film.

For additional details on barrier layers also see, for example, application having U.S. Ser. No. 61/262,406, filed Nov. 18, 2009, published as U.S. Pat. App. Pub. No.

2012/0227809 (Bharti et al.), the disclosure of which is incorporated herein by reference.

EXEMPLARY EMBODIMENTS

1. A UV stable multi-layer optical film comprising at least a plurality of first and second optical layers collectively reflecting at least 50 percent of incident UV light over at least a 30 nanometer wavelength range in a wavelength range from at least 300 nanometers to 400 nanometers, wherein some of at least one of the first or second optical layers comprises a UV absorber.
2. The multi-layer optical film of embodiment 1, wherein incident UV light transmission through at least the plurality of first and second optical layers is less than 5 percent in a wavelength range from at least 300 nanometers to 400 nanometers.
3. The multi-layer optical film of any preceding embodiment, wherein incident light transmission through at least the plurality of first and second optical layers is less than 5 percent in a wavelength range from at least 300 nanometers to 430 nanometers.
4. The multi-layer optical film of any preceding embodiment having a UV transmission band edge in a range from 10 to 90 percent transmission spanning less than 20 nanometers.
5. The multi-layer optical film of any of embodiments 1 to 3 having a UV transmission band edge in a range from 10 to 90 percent transmission spanning less than 10 nanometers.
6. The multi-layer optical film of any preceding embodiment having a thickness in a range from 25 micrometers to 250 micrometers.
7. The multi-layer optical film of any preceding embodiment, wherein the plurality of the first and second optical layers have a collective thickness in a range from 15 micrometers to 25 micrometers
8. The multi-layer optical film of any preceding embodiment, wherein the at least first optical layer comprises PMMA, PC, or PET, and wherein the second optical layer comprises THV, PMMA, or CoPMMA.
9. An assembly comprising the multi-layer optical film of any preceding embodiment and a barrier layer.
10. The assembly of embodiment 9, wherein the barrier layer comprises at least first and second polymer layers separated by an inorganic barrier layer.
11. A composite article comprising a substrate having a major surface, and the assembly of any either embodiment 9 or 10 on at least a portion of the major surface.
12. A vehicle window comprising the assembly of any either embodiment 9 or 10.
13. A commercial graphic sign comprising the assembly of any either embodiment 9 or 10.
14. A light assembly comprising the assembly of any either embodiment 9 or 10.
15. A sign comprising the assembly of any either embodiment 9 or 10.
16. An LCD comprising the assembly of any either embodiment 9 or 10.
17. A building exterior comprising the assembly of any either embodiment 9 or 10.
18. A photovoltaic module comprising the assembly of any either embodiment 9 or 10.
19. The photovoltaic module of embodiment 18 that is a flexible module.
20. A composite article comprising a substrate having a major surface, and the film of any of embodiments 1 to 8 on at least a portion of the major surface.
21. A vehicle window comprising the film of any of embodiments 1 to 8.
22. A commercial graphic sign comprising the film of any of embodiments 1 to 8.
23. A light assembly comprising the film of any of embodiments 1 to 8.
24. A sign comprising the film of any of embodiments 1 to 8.
25. An LCD comprising the film of any of embodiments 1 to 8.
26. A building exterior comprising the film of any of embodiments 1 to 8.
27. A photovoltaic module comprising the film of any of embodiments 1 to 8.
28. The photovoltaic module of embodiment 27 that is a flexible module.
29. A multi-layer optical film comprising a plurality of at least first and second optical layers having a major surface and collectively reflecting at least 50 percent of incident UV light over at least a 30 nanometer wavelength range in a wavelength range from at least 300 nanometers to 400 nanometers, and a third optical layer having first and second generally opposed first and second major surfaces and absorbing at least 50 percent of incident UV light over at least a 30 nanometer wavelength range in a wavelength range from at least 300 nanometers to 400 nanometers, wherein the major surface of the plurality of first and second optical layers is proximate to the first major surface of the third optical layer, and wherein there is not another multi-layer optical film proximate the second surface of the third optical layer.
30. The multi-layer optical film of embodiment 29, wherein the major surface of the plurality of first and second optical layers contacts the first major surface of the third optical layer.
31. The multi-layer optical film of any of either embodiment 29 or 30, wherein incident UV light transmission through at least the first, second, and third optical layers is less than 5 percent in a wavelength range from at least 300 nanometers to 400 nanometers.
32. The multi-layer optical film of any of either embodiment 29 or 30, wherein incident light transmission through at least the first, second, and third optical layers is less than 5 percent in a wavelength range from at least 300 nanometers to 430 nanometers.
33. The multi-layer optical film of any of embodiments 29 to 32 having a UV transmission band edge in a range from 10 to 90 percent transmission spanning less than 20 nanometers.
34. The multi-layer optical film of any of embodiments 29 to 32 having a UV transmission band edge in a range from 10 to 90 percent transmission spanning less than 10 nanometers.
35. The multi-layer optical film of any of embodiments 29 to 34 having a thickness in a range from 25 micrometers to 250 micrometers.
36. The multi-layer optical film of any of embodiments 29 to 35, wherein the at least first and second optical layers have a collective thickness in a range from 15 micrometers to 25 micrometers
37. The multi-layer optical film of any of embodiments 29 to 36, wherein the at least first optical layer comprises PMMA, PC, or PET, and wherein the second optical layer comprises THV, PMMA, or CoPMMA.
38. The multi-layer optical film of any of embodiments 29 to 36, wherein the at least first and second optical layers comprise PMMA and THV.

39. The multi-layer optical film o of any of embodiments 29 to 38, wherein the at least third optical layer have a collective thickness in a range from 10 micrometers to 200 micrometers.

40. The multi-layer optical film of any of embodiments 29 to 39, wherein the third optical layer comprise at least one of PET, CoPET, PC, PMMA, CoPMMA, or blends of PMMA and PVDF.

41. The multi-layer optical film of any of embodiments 29 to 40, wherein at least one of the first or second optical layers comprise a UV absorber.

42. An assembly comprising the multi-layer optical film of any of embodiments 29 to 41 and a barrier layer.

43. The assembly of embodiment 42, wherein the barrier layer comprises at least first and second polymer layers separated by an inorganic barrier layer.

44. A composite article comprising a substrate having a major surface, and the assembly of any either embodiment 42 or 43 on at least a portion of the major surface.

45. A vehicle window comprising the assembly of any either embodiment 42 or 43.

46. A commercial graphic sign comprising the assembly of any either embodiment 42 or 43.

47. A light assembly comprising the assembly of any either embodiment 42 or 43.

48. A sign comprising the assembly of any either embodiment 42 or 43.

49. An LCD comprising the assembly of any either embodiment 42 or 43.

50. A building exterior comprising the assembly of any either embodiment 42 or 43.

51. A photovoltaic module comprising the assembly of any either embodiment 42 or 43.

52. The photovoltaic module of embodiment 51 that is a flexible module.

53. A composite article comprising a substrate having a major surface, and the film of any of embodiments 29 to 41 on at least a portion of the major surface.

54. A vehicle window comprising the film of any of embodiments 29 to 41.

55. A commercial graphic sign comprising the film of any of embodiments 29 to 41.

56. A light assembly comprising the film of any of embodiments 29 to 41.

57. A sign comprising the film of any of embodiments 29 to 41.

58. An LCD comprising the film of any of embodiments 29 to 41.

59. A building exterior comprising the film of any of embodiments 29 to 41.

60. A photovoltaic module comprising the film of any of embodiments 29 to 41.

61. The photovoltaic module of embodiment 60 that is a flexible module.

62. A multi-layer optical film comprising a first plurality of at least first and second optical layers having a major surface and collectively reflecting at least 50 percent of incident UV light over at least a 30 nanometer wavelength range in a wavelength range from at least 300 nanometers to 400 nanometers, and a third optical layer having first and second generally opposed first and second major surfaces and collectively absorbing at least 50 percent of incident UV light over at least a 30 nanometer wavelength range in a wavelength range from at least 300 nanometers to 400 nanometers, wherein the major surface of the plurality of first and second optical layers is proximate to the first major surface of the third optical layer, and wherein there is a second plurality of first and second optical layers having a major surface and collectively reflecting at least 50 percent of incident UV light over at least a 30 nanometer wavelength range in a wavelength range from at least 300 nanometers to 400 nanometers proximate to the second major surface of the third optical layer.

63. The multi-layer optical film of embodiment 62, wherein the major surface of the plurality of first and second optical layers contacts the first major surface of the third optical layer, and wherein the major surface of the second plurality of first and second optical layers contacts the second major surface of the third optical layer.

64. The multi-layer optical film of any either embodiment 62 or 63, wherein incident UV light transmission through at least the first, second, and third optical layers is less than 5 percent in a wavelength range from at least 300 nanometers to 400 nanometers.

65. The multi-layer optical film of any either embodiment 62 or 63, wherein incident light transmission through at least the first, second, and third optical layers is less than 5 percent in a wavelength range from at least 300 nanometers to 430 nanometers.

66. The multi-layer optical film of any of embodiments 62 to 65, wherein the third optical layer has a collective thickness in a range from 10 micrometers to 200 micrometers.

67. The multi-layer optical film of any of embodiments 62 to 66, wherein the at least first optical layers comprise at least one of PMMA, PC, or PET, and wherein the second optical layers comprise at least one of THV, PMMA, or CoPMMA.

68. The multi-layer optical film of any of embodiments 62 to 67, wherein the third optical layer comprise at least one of PET, CoPET, PC, PMMA, CoPMMA, or blends of PMMA and PVDF.

69. The multi-layer optical film of any of embodiments 62 to 68 having a UV transmission band edge in a range from 10 to 90 percent transmission spanning less than 20 nanometers.

70. The multi-layer optical film of any of embodiments 62 to 69 having a UV transmission band edge in a range from 10 to 90 percent transmission spanning less than 10 nanometers.

71. The multi-layer optical film of any of embodiments 62 to 70 having a thickness in a range from 25 micrometers to 250 micrometers.

72. The multi-layer optical film of any of embodiments 62 to 71, wherein each of the pluralities at least first and second optical layers each have a collective thickness in a range from 15 micrometers to 25 micrometers.

73. The multi-layer optical film of any of embodiments 62 to 72, wherein the at least third optical layer have a collective thickness in a range from 10 micrometers to 200 micrometers.

74. The multi-layer optical film of any of embodiments 62 to 73, wherein some of at least one of the first or second optical layers comprise a UV absorber.

75. An assembly comprising the multi-layer optical film of any of embodiments 62 to 74 and a barrier layer.

76. The assembly of embodiment 75, wherein the barrier layer comprises at least first and second polymer layers separated by an inorganic barrier layer.

77. A composite article comprising a substrate having a major surface, and the assembly of any either embodiment 75 or 76 on at least a portion of the major surface.

78. A vehicle window comprising the assembly of any either embodiment 75 or 76.

79. A commercial graphic sign comprising the assembly of any either embodiment 75 or 76.

80. A light assembly comprising the assembly of any either embodiment 75 or 76.

81. A sign comprising the assembly of any either embodiment 75 or 76.

82. An LCD comprising the assembly of any either embodiment 75 or 76.

83. A building exterior comprising the assembly of any either embodiment 75 or 76.

84. A photovoltaic module comprising the assembly of any either embodiment 75 or 76.

85. The photovoltaic module of embodiment 84 that is a flexible module.

86. A composite article comprising a substrate having a major surface, and the film of any of embodiments 62 to 74 on at least a portion of the major surface.

87. A vehicle window comprising the film of any of embodiments 62 to 74.

88. A commercial graphic sign comprising the film of any of embodiments 62 to 74.

89. A light assembly comprising the film of any of embodiments 62 to 74.

90. A sign comprising the film of any of embodiments 62 to 74.

91. An LCD comprising the film of any of embodiments 62 to 74.

92. A building exterior comprising the film of any of embodiments 62 to 74.

93. A photovoltaic module comprising the film of any of embodiments 62 to 74.

94. The photovoltaic module of embodiment 93 that is a flexible module.

95. A multi-layer optical film comprising a plurality of at least first and second optical layers having opposing first and second major surfaces and collectively reflecting at least 50 percent of incident UV light over at least a 30 nanometer wavelength range in a wavelength range from at least 300 nanometers to 400 nanometers, a third optical layer having a major surface and absorbing at least 50 percent of incident UV light over at least a 30 nanometer wavelength range in a wavelength range from at least 300 nanometers to 400 nanometers proximate to the first major surface of the plurality of at least first and second optical layers, and a fourth optical layer absorbing at least 50 percent of incident UV light over at least a 30 nanometer wavelength range in a wavelength range from at least 300 nanometers to 400 nanometers proximate to the second major surface of the plurality of at least first and second optical layers.

96. The multi-layer optical film of embodiment 95, wherein the major surface of the third layer contacts the first major surface of the plurality of first and second optical layers, and wherein the major surface of the fourth layer contacts the second major surface of the plurality of first and second optical layers.

97. The multi-layer optical film of any either embodiment 95 or 96, wherein incident UV light transmission through at least the first, second, and third optical layers is less than 5 percent in a wavelength range from at least 300 nanometers to 400 nanometers.

98. The multi-layer optical film of any either embodiment 95 or 96, wherein incident light transmission through at least the first, second, third, and fourth optical layers is less than 5 percent in a wavelength range from at least 300 nanometers to 430 nanometers.

99. The multi-layer optical film of any of embodiments 95 to 98, wherein the third optical layer has a collective thickness in a range from 10 micrometers to 200 micrometers.

100. The multi-layer optical film of any of embodiments 95 to 99, wherein the fourth optical layer has a collective thickness in a range from 10 micrometers to 200 micrometers.

101. The multi-layer optical film of any of embodiments 95 to 100, wherein the at least first optical layers comprise at least one of PMMA, PC, or PET, and wherein the second optical layers comprise at least one of THV, PMMA, or CoPMMA.

102. The multi-layer optical film of any of embodiments 95 to 101, wherein the third and fourth optical layers independently comprise at least one of PET, CoPET, PC, PMMA, CoPMMA, or blends of PMMA and PVDF.

103. The multi-layer optical film of any of embodiments 95 to 102 having a UV transmission band edge in a range from 10 to 90 percent transmission spanning less than 20 nanometers.

104. The multi-layer optical film of any of embodiments 95 to 103 having a UV transmission band edge in a range from 10 to 90 percent transmission spanning less than 10 nanometers.

105. The multi-layer optical film of any of embodiments 95 to 104 having a thickness in a range from 25 micrometers to 250 micrometers.

106. The multi-layer optical film of any of embodiments 95 to 105, wherein each of the pluralities at least first and second optical layers each have a collective thickness in a range from 15 micrometers to 25 micrometers.

107. The multi-layer optical film o of any of embodiments 95 to 106, wherein the at least third optical layer have a collective thickness in a range from 10 micrometers to 200 micrometers.

108. The multi-layer optical film of any of embodiments 95 to 107, wherein some of at least one of the first or second optical layers comprise a UV absorber.

109. An assembly comprising the multi-layer optical film of any of embodiments 95 to 108 and a barrier layer.

110. The assembly of embodiment 109, wherein the barrier layer comprises at least first and second polymer layers separated by an inorganic barrier layer.

111. A composite article comprising a substrate having a major surface, and the assembly of any either embodiment 109 or 110 on at least a portion of the major surface.

112. A vehicle window comprising the assembly of any either embodiment 109 or 110.

113. A commercial graphic sign comprising the assembly of any either embodiment 109 or 110.

114. A light assembly comprising the assembly of any either embodiment 109 or 110.

115. A sign comprising the assembly of any either embodiment 109 or 110.

116. An LCD comprising the assembly of any either embodiment 109 or 110.

117. A building exterior comprising the assembly of any either embodiment 109 or 110.

118. A photovoltaic module comprising the assembly of any either embodiment 109 or 110.

119. The photovoltaic module of embodiment 118 that is a flexible module.

120. A composite article comprising a substrate having a major surface, and the film of any of embodiments 95 to 107 on at least a portion of the major surface.

121. A vehicle window comprising the film of any of embodiments 95 to 107.

122. A commercial graphic sign comprising the film of any of embodiments 95 to 107.

123. A light assembly comprising the film of any of embodiments 95 to 107.

124. A sign comprising the film of any of embodiments 95 to 107.

125. An LCD comprising the film of any of embodiments 95 to 107.

126. A building exterior comprising the film of any of embodiments 95 to 107.

127. A photovoltaic module comprising the film of any of embodiments 95 to 107.

128. The photovoltaic module of embodiment 127 that is a flexible module.

129. A multi-layer optical film comprising at least first and second optical layers reflecting at least 50 percent of incident light over a 30 nanometer wavelength range in a wavelength range from 300 nanometers to 430 nanometers, optionally a third optical layer absorbing at least 50 percent of incident light over at least a 30 nanometer wavelength range in a wavelength range from at least 300 nanometers to 430 nanometers and a fourth optical layer comprising polyethylene naphthalate, wherein at least one of the first, second, or third optical layers absorbs at least 50 percent of incident light over at least a 30 nanometer wavelength range in a wavelength range from at least 300 nanometers to 430 nanometers.

130. The multi-layer optical film of embodiment 129, wherein incident UV light transmission through at least the first, second, and third optical layers is less than 5 percent in a wavelength range from at least 300 nanometers to 400 nanometers.

131. The multi-layer optical film of embodiment 130, wherein incident light transmission through at least the first, second, and third optical layers is less than 5 percent in a wavelength range from at least 300 nanometers to 430 nanometers.

132. The multi-layer optical film of any of embodiments 129 to 131, wherein the third optical layer has a collective thickness in a range from 10 micrometers to 200 micrometers.

133. The multi-layer optical film of any of embodiments 129 to 131, wherein the at least first optical layers comprise at least one of PMMA, PC, or PET, and wherein the second optical layers comprise at least one of THV, PMMA, or CoPMMA.

134. The multi-layer optical film of any of embodiments 129 to 133, wherein the third optical layer comprise at least one of PET, CoPET, PC, PMMA, CoPMMA, or blends of PMMA and PVDF.

135. The multi-layer optical film of any of embodiments 129 to 134 having a UV transmission band edge in a range from 10 to 90 percent transmission spanning less than 20 nanometers.

136. The multi-layer optical film of any of embodiments 129 to 134 having a UV transmission band edge in a range from 10 to 90 percent transmission spanning less than 10 nanometers.

137. The multi-layer optical film of any of embodiments 129 to 136 having a thickness in a range from 25 micrometers to 250 micrometers.

138. The multi-layer optical film of any of embodiments 129 to 137, wherein each of the pluralities at least first and second optical layers each have a collective thickness in a range from 15 micrometers to 25 micrometers.

139. The multi-layer optical film o of any of embodiments 129 to 138, wherein the at least third optical layer have a collective thickness in a range from 10 micrometers to 200 micrometers.

140. The multi-layer optical film of any of embodiments 129 to 139, wherein some of at least one of the first or second optical layers comprise a UV absorber.

141. An assembly comprising the multi-layer optical film of any of embodiments 129 to 140 and a barrier layer.

142. The assembly of embodiment 141, wherein the barrier layer comprises at least first and second polymer layers separated by an inorganic barrier layer.

143. A composite article comprising a substrate having a major surface, and the assembly of either embodiment 141 or 142 on at least a portion of the major surface.

144. A vehicle window comprising the assembly of either embodiment 141 or 142.

145. A commercial graphic sign comprising the assembly of either embodiment 141 or 42.

146. A light assembly comprising the assembly of either embodiment 141 or 142.

147. A sign comprising the assembly of either embodiment 141 or 142.

148. An LCD comprising the assembly of either embodiment 141 or 142.

149. A building exterior comprising the assembly of either embodiment 141 or 142.

150. A photovoltaic module comprising the assembly of either embodiment 141 or 142.

151. The photovoltaic module of embodiment 150 that is a flexible module.

152. A composite article comprising a substrate having a major surface, and the film of any of embodiments 129 to 138 on at least a portion of the major surface.

153. A vehicle window comprising the film of any of embodiments 129 to 138.

154. A commercial graphic sign comprising the film of any of embodiments 129 to 138.

155. A light assembly comprising the film of any of embodiments 129 to 138.

156. A sign comprising the film of any of embodiments 129 to 138.

157. An LCD comprising the film of any of embodiments 129 to 138.

158. A building exterior comprising the film of any of embodiments 129 to 138.

159. A photovoltaic module comprising the film of any of embodiments 129 to 138.

160. The photovoltaic module of embodiment 159 that is a flexible module.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Comparative Example A

A multilayer optical film was made with first optical layers of polyethylene 2,6 naphthalate (PEN) and second optical layers of polymethylmethacrylate (PMMA1) (obtained from Arkema Inc. Philadelphia, Pa., under the trade designation "PEXIGLAS VO44"). The polyethylene 2,6 naphthalate (PEN) was synthesized in a batch reactor with the following raw material charge: 2,6 dimethyl naphthalene dicarboxylate (136 kg), ethylene glycol (73 kg), manganese (II) acetate (27 grams), cobalt(II) acetate (27 grams) and antimony(III) acetate (48 grams). Under a pressure of 1520 torr or 2×105 N/m2 (2 atm.), this mixture was heated to 254° C. while removing methanol (a transesterification reaction by-product). After 35 kg of methanol was removed, 49 grams of triethyl phosphonoacetate was charged to the reactor and the pressure was gradually reduced to (131 N/m2) (1 torr) while heating to 290° C. The condensation reaction by-product, ethylene glycol, was continuously removed until a polymer with an intrinsic viscosity of 0.48 dL/g (as measured in 60/40 wt. % phenol/o-dichlorobenzene) was produced.

The PEN and PMMA1 were coextruded through a multilayer polymer melt manifold to create a multilayer melt stream having 530 alternating first and second optical layers. In addition to the first and second optical layers, a pair of non-optical layers also comprised of PEN were coextruded as protective skin layers on either side of the optical layer stack. This multilayer coextruded melt stream was cast onto a chilled roll at 22 meters per minute creating a multilayer cast web about 1075 micrometers (43 mils) thick.

The multilayer cast web was then heated in a tenter oven at 145° C. for 10 seconds prior to being biaxially oriented to a draw ratio of 3.8×3.8. The oriented multilayer film was further heated to 225° C. for 10 seconds to increase crystallinity of the PEN layers. Reflectivity of this multilayer visible mirror film was measured with a spectrophotometer (obtained from Perkin-Elmer, Inc., Waltham, Mass., under the trade designation "Lambda 950") to have an average reflectivity of 98.5% over a bandwidth of 390-850 nm. After 3000 hours exposure to a Xenon arc lamp weatherometer according to ASTM G155-05a (October, 2005), a change in b* of 5 units was measured with the spectrophotometer ("Lambda 950").

Comparative Example B

An ultraviolet (UV) reflective multilayer optical film was made with first optical layers of polyethylene terephthalate (PET1) (obtained from Eastman Chemical, Kingsport, Tenn., under the trade designation "EASTAPAK 7452") and second optical layers of a copolymer of 75 weight percent methyl methacrylate and 25 weight percent ethyl acrylate (coPMMA1) (obtained from Ineos Acrylics, Inc., Memphis, Tenn., under the trade designation "PERSPEX CP63"). The PET1 and coPMMA1 were coextruded through a multilayer polymer melt manifold to form a stack of 224 optical layers. The layer thickness profile (layer thickness values) of this UV reflector was adjusted to be approximately a linear profile with the first (thinnest) optical layers adjusted to have about a ¼ wave optical thickness (index times physical thickness) for 350 nm light and progressing to the thickest layers which were adjusted to be about ¼ wave thick optical thickness for 410 nm light. Layer thickness profiles of such films were adjusted to provide for improved spectral characteristics using the axial rod apparatus reported in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) were coextruded on either side of the optical stack. This multilayer coextruded melt stream was cast onto a chilled roll at 5.4 meters per minute creating a multilayer cast web about 500 micrometers (20 mils) thick. The multilayer cast web was then preheated for about 10 seconds at 95° C. and biaxially oriented at draw ratios of 3.5×3.7. The oriented multilayer film was further heated at 225° C. for 10 seconds to increase crystallinity of the PET layers.

The UV-reflective multilayer optical film (Film 1) was measured with the spectrophotometer ("Lambda 950") to transmit less than 1 percent of the UV light over a bandwidth of 350-400 nm.

After 3000 hours exposure to a Xenon arc lamp weatherometer according to ASTM G155-05a, a change in b* of 3.5 units was measured with the spectrophotometer ("Lambda 950").

Example 1

A UV reflective multilayer optical film was made with first optical layers of PET1 "and second optical layers of coPMMA1. The PET1 and coPMMA1 were coextruded through a multilayer polymer melt manifold to form a stack of 224 optical layers. The layer thickness profile (layer thickness values) of this UV reflector was adjusted to be approximately a linear profile with the first (thinnest) optical layers adjusted to have about a ¼ wave optical thickness (index times physical thickness) for 350 nm light and progressing to the thickest layers which were adjusted to be about ¼ wave thick optical thickness for 400 nm light. Layer thickness profiles of such films were adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) were coextruded on either side of the optical stack. 2 wt % of UV absorber (obtained from Ciba Specialty Chemicals Corporation, Tarryton, N.Y., under the trade designation "TINUVIN 1577 UVA") was compounded into these PET protective skin layers. This multilayer coextruded melt stream was cast onto a chilled roll at 5.4 meters per minute creating a multilayer cast web approximately 500 micrometers (20 mils) thick. The multilayer cast web was then preheated for about 10 seconds at 95° C. and biaxially oriented at draw ratios of 3.5×3.7. The oriented multilayer film was further heated at 225° C. for 10 seconds to increase crystallinity of the PET layers.

The UV-reflective multilayer optical film (Film 1) was measured with the spectrophotometer ("Lambda 950") to transmit less than 2 percent of the UV light over a bandwidth of 350-400 nm.

After 3000 hours exposure to a Xenon arc lamp weatherometer according to ASTM G155-05a (October, 2005), a change in b* of less than 1 units was measured with the spectrophotometer ("Lambda 950").

Example 2

A UV reflective multilayer optical Film 1 was made with first optical layers of PET1 and second optical layers of coPMMA1. The PET1 and coPMMA1 were coextruded through a multilayer polymer melt manifold to form a stack of 224 optical layers. The layer thickness profile (layer thickness values) of this UV reflector was adjusted to be approximately a linear profile with the first (thinnest) optical layers adjusted to have about a ¼ wave optical thickness (index times physical thickness) for 350 nm light and progressing to the thickest layers which were adjusted to be about ¼ wave thick optical thickness for 400 nm light. Layer thickness profiles of such films were adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) were coextruded on either side of the optical stack. 2 wt % of UV absorber ("TINUVIN 1577 UVA") was compounded into these PET protective skin layers. This multilayer coextruded melt stream was cast onto a chilled roll at 5.4 meters per minute creating a multilayer cast web approximately 500 micrometers (20 mils) thick. The multilayer cast web was then preheated for about 10 seconds at 95° C. and biaxially oriented at draw ratios of 3.5×3.7. The oriented multilayer film was further heated at 225° C. for 10 seconds to increase crystallinity of the PET layers.

The UV-reflective multilayer optical film (Film 1) was measured with the spectrophotometer ("Lambda 950") to transmit less than 2 percent of the UV light over a bandwidth of 350-400 nm.

Film 1 was laminated using an optically clear adhesive (available from 3M Company, St. Paul, Minn., under the trade designation "OPTICALLY CLEAR LAMINATING ADHESIVE PSA 8171") to one surface of a 75 micrometer thick sheet made of polymethylmethacrylate (PMMA2) (obtained from Ineos Acrylics, Inc. Wilmington, Del., under the trade designation "CP82" which had been compounded with 3 wt % UV absorber ("TINUVIN 1577 UVA"). Another sample of Film 1 was laminated to the second surface of PMMA2 with the same 8171 laminating adhesive.

The UV-reflective-absorbing-reflective laminate Film 2 was measured with the spectrophotometer ("Lambda 950") to transmit less than 0.1 percent of the UV light over a bandwidth of 350-400 nm.

After 3000 hours exposure to a Xenon arc lamp weatherometer according to ASTM G155-05a (October, 2005), a change in b* of less than 1 units was measured with the spectrophotometer ("Lambda 950").

Example 3 (A Prophetic Example)

An article can be laminated to or coextruded with a multilayer UV mirror made with UV transparent polymers such as PMMA (e.g., PMMA1 or PMMA2) and THV. This multilayer UV reflective mirror can be made with first optical layers of PMMA and second polymer layers of a fluoropolymer (e.g., available from Dyneon, Oakdale, Minn., under the trade designation "THV2030"). The PMMA and the fluoropolymer can be coextruded through a multilayer polymer melt manifold to create a multilayer melt stream having 150 alternating first and second polymer layers. Additionally, a pair of non-optical layers also comprised of PMMA can be coextruded as protective skin layers on either side of the optical layer stack. These PMMA skins layers can be extrusion compounded with 2 wt. % of a UV absorber (e.g., "Tinuvin 1577"). This multilayer coextruded melt stream can be cast onto a chilled roll at 22 meters per minute creating a multilayer cast web approximately 300 micrometers (12 mils) thick. The multilayer cast web is then heated in a tenter oven at 135° C. for 10 seconds prior to being biaxially oriented to a draw ratio of 3.8×3.8.

Example 4 (A Prophetic Example)

A UV reflective multilayer optical Film 3 can be made with first optical layers of PET1 and second optical layers of coPMMA1. The PET 1 and coPMMA1 can be coextruded through a multilayer polymer melt manifold to form a stack of 224 optical layers. The layer thickness profile (layer thickness values) of this UV reflector can be adjusted to be approximately a linear profile with the first (thinnest) optical layers adjusted to have about a ¼ wave optical thickness (index times physical thickness) for 300 nm light and progressing to the thickest layers which can be adjusted to be about ¼ wave thick optical thickness for 400 nm light. Layer thickness profiles of such films can be adjusted to provide for improved spectral characteristics using the axial rod apparatus disclosed in U.S. Pat. No. 6,783,349 (Neavin et al.), the disclosure of which is incorporated herein by reference, combined with layer profile information obtainable with atomic force microscopic techniques. 20 wt % of UV absorber masterbatch (e.g., available under the trade designation "SUKANO TA07-07 MB" from Sukano Polymers Corp, Duncan, S.C.) can be extrusion compounded into both the first optical layers (PET1) and second optical layers (coPMMA1).

In addition to these optical layers, non-optical protective skin layers of PET1 (260 micrometers thickness each) can be coextruded on either side of the optical stack. 20 wt % of UV absorber masterbatch (e.g., "SUKANO TA07-07 MB") can be compounded into these PET protective skin layers. This multilayer coextruded melt stream can be cast onto a chilled roll at 5.4 meters per minute creating a multilayer cast web approximately 500 micrometers (20 mils) thick. The multilayer cast web can then be preheated for about 10 seconds at 95° C. and biaxially oriented at a draw ratios of 3.5×3.7. The oriented multilayer film can be further heated at 225° C. for 10 seconds to increase crystallinity of the PET layers.

Example 5 (A Prophetic Example)

An article can be laminated to, or coextruded with, a multilayer UV mirror made with UV transparent polymers such as PMMA (e.g., PMMA1 or PMMA2) and THV. This multilayer UV reflective mirror can be made with first optical layers of PMMA that has been extrusion compounded with 3 wt % absorber (e.g., "TINUVIN 1577 UV") and second polymer layers of a fluoropolymer (e.g., "THV2030"). The PMMA and the fluoropolymer can be coextruded through a multilayer polymer melt manifold to create a multilayer melt stream having 550 alternating first and second polymer layers. Additionally, a pair of non-optical layers also comprised of PMMA can be coextruded as protective skin layers on either side of the optical layer stack. These PMMA skins layers can be extrusion compounded with 2 wt. % of a UV absorber (e.g., "Tinuvin 1577"). This multilayer coextruded melt stream can be cast onto a chilled roll at 22 meters per minute creating a multilayer cast web approximately 500 micrometers (20 mils) thick. The multilayer cast web is then heated in a tenter oven at 135° C. for 10 seconds prior to being biaxially oriented to a draw ratio of 3.8×3.8.

Example 6 (A Prophetic Example)

A UV reflective multilayer optical Film 3 can be made as described in Example 4.

A near infra-red reflective multilayer optical Film 4 can be made with first optical layers of PET1 and second optical layers of coPMMA1. The PET1 and coPMMA1 can be coextruded through a multilayer polymer melt manifold to form a stack of 550 optical layers. The layer thickness profile (layer thickness values) of this near infra-red reflector can be adjusted to be approximately a linear profile with the first (thinnest) optical layers adjusted to have about a ¼ wave optical thickness (index times physical thickness) for 900 nm light and progressing to the thickest layers which can be adjusted to be about ¼ wave thick optical thickness for 1150 nm light. Layer thickness profiles of such films can be adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) can be coextruded on either side of the optical stack. This multilayer coextruded melt stream can be cast onto a chilled roll at 3.23 meters per minute creating a multilayer cast web approximately 1800 micrometers (73 mils) thick. The multilayer cast web can then be preheated for about 10 seconds at 95° C. and uniaxially oriented in the machine direction at a draw ratio of 3.3:1. The multilayer cast web can then be heated in a tenter oven at 95° C. for about 10 seconds prior to being uniaxially oriented in the transverse direction to a draw ratio of 3.5:1. The oriented multilayer film can be further heated at 225° C. for 10 seconds to increase crystallinity of the PET layers.

Film 3 and Film 4 can be laminated together using an optically clear adhesive (e.g., available from 3M Company, St. Paul, Minn., under the trade designation "OPTICALLY CLEAR LAMINATING ADHESIVE PSA 8171") and then laminated inside a windshield with PVB (polyvinyl butyral) adhesive.

Example 7 (A Prophetic Example)

A UV reflective multilayer optical Film 3 can be made as described in Example 4.

A near infra-red reflective multilayer optical Film 4 can be made with first optical layers of PET1 and second optical layers of coPMMA1. The PET1 and coPMMA1 can be coextruded through a multilayer polymer melt manifold to form a stack of 550 optical layers. The layer thickness profile (layer thickness values) of this near infra-red reflector can be adjusted to be approximately a linear profile with the first (thinnest) optical layers adjusted to have about a ¼ wave optical thickness (index times physical thickness) for 900 nm light and progressing to the thickest layers which can be adjusted to be about ¼ wave thick optical thickness for 1150 nm light. Layer thickness profiles of such films can be adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) can be coextruded on either side of the optical stack. This multilayer coextruded melt stream can be cast onto a chilled roll at 3.23 meters per minute creating a multilayer cast web approximately 1800 micrometers (73 mils) thick. The multilayer cast web can then be preheated for about 10 seconds at 95° C. and uniaxially oriented in the machine direction at a draw ratio of 3.3:1. The multilayer cast web can then be heated in a tenter oven at 95° C. for about 10 seconds prior to being uniaxially oriented in the transverse direction to a draw ratio of 3.5:1. The oriented multilayer film can be further heated at 225° C. for 10 seconds to increase crystallinity of the PET layers.

Film 3 and Film 4 can be laminated together using an optically clear adhesive (e.g., "OPTICALLY CLEAR LAMINATING ADHESIVE PSA 8171") and then laminated inside a window with the same optically clear adhesive.

Example 8 (A Prophetic Example)

A UV reflective multilayer optical Film 3 can be made as described in Example 4.

Film 3 can then be laminated to a liquid crystal display using an optically clear adhesive (e.g., "OPTICALLY CLEAR LAMINATING ADHESIVE PSA 8171") for outdoor use.

Example 9 (A Prophetic Example)

A UV reflective multilayer optical Film 3 can be made as described in Example 4.

A near infra-red reflective multilayer optical Film 4 can be made with first optical layers of PET1 and second optical layers of coPMMA1. The PET1 and coPMMA1 can be coextruded through a multilayer polymer melt manifold to form a stack of 550 optical layers. The layer thickness profile (layer thickness values) of this near infra-red reflector can be adjusted to be approximately a linear profile with the first (thinnest) optical layers adjusted to have about a ¼ wave optical thickness (index times physical thickness) for 900 nm light and progressing to the thickest layers which can be adjusted to be about ¼ wave thick optical thickness for 1150 nm light. Layer thickness profiles of such films can be adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) can be coextruded on either side of the optical stack. This multilayer coextruded melt stream can be cast onto a chilled roll at 3.23 meters per minute creating a multilayer cast web approximately 1800 micrometers (73 mils) thick. The multilayer cast web can then be preheated for about 10 seconds at 95° C. and uniaxially oriented in the machine direction at a draw ratio of 3.3:1. The multilayer cast web can then be heated in a tenter oven at 95° C. for about 10 seconds prior to being uniaxially oriented in the transverse direction to a draw ratio of 3.5:1. The oriented multilayer film can be further heated at 225° C. for 10 seconds to increase crystallinity of the PET layers.

Film 3 and Film 4 can be laminated together using an optically clear adhesive (e.g., "OPTICALLY CLEAR LAMINATING ADHESIVE PSA 8171") and then laminated inside a liquid crystal display with the same optically clear adhesive.

Example 10 (A Prophetic Example)

A UV reflective multilayer optical Film 3 can be made as described in Example 4.

Film 3 can then be laminated to a commercial graphic using an optically clear adhesive (e.g., "OPTICALLY CLEAR LAMINATING ADHESIVE PSA 8171") for outdoor use.

Example 11 (A Prophetic Example)

A UV reflective multilayer optical Film 3 can be made as described in Example 4.

Film 3 can then be laminated to a lighted box sign using an optically clear adhesive (e.g., "OPTICALLY CLEAR LAMINATING ADHESIVE PSA 8171") for outdoor use.

Example 12 (A Prophetic Example)

A UV reflective multilayer optical Film 3 can be made as described in Example 4.

The UV multi-layer reflective optical Film 3 can then be laminated to a photovoltaic module using cross-linkable adhesives.

Example 13 (A Prophetic Example)

A UV reflective multilayer optical Film 3 can be made as described in Example 4.

A micro-replication casting tool was fabricated using a diamond with a 53-degree apex angle to cut a copper roll with linear prism grooves on a 100 micron pitch. This metal micro-replicating casting roll tool was then used to make a "riblet" 53 degree linear prism polypropylene polymer film tool with the same pattern by continuously extruding and quenching molten polypropylene on the metal casting roll tool.

Polyurethane films can be prepared using a notched bar flatbed coating apparatus and the following procedure: A helical blade mixer can be used to mix 1368 grams of a urethane monomer (e.g., available from King Industries, Norwalk, Conn., under the trade designation "KFLEX 188" with 288 grams of a UV absorber (e.g., available from Ciba Specialty Chemicals Corporation under the trade designation "TINUVIN 405"), 144 grams of HALS (e.g., available from Ciba Specialty Chemicals Corporation under the trade designation "TINUVIN 123"), and 4.3 grams of a catalyst (e.g., available from Air Products And Chemicals, Inc., Allentown, Pa., under the trade designation "DABCO T12") for about 10 minutes. This polyol mixture can be degassed in a vacuum oven at 60° C. for 15 hours, then loaded into plastic Part A dispensing cartridges and kept warm at 50° C. A polyisocyante (e.g., available from Bayer, Pittsburgh, Pa., under the trade designation "DESMODUR N3300A" can be loaded into Part B dispensing cartridges and also kept warm at 50° C. A variable drive pump can be set to have a volumetric ratio of Part A:Part B of 100:77. A 30.5 cm 12 inch) long static mixer would be used to blend the two components prior to coating. The UV reflective Film 3 would be loaded onto the lower unwind and coated at a line speed of 1.5 m/min. (5 feet per minute). The heated platen oven would have 5 zones, each 1.2 m (4 feet) long. The temperature of the first 4 zones can be set to 71° C. (160° F.) while the last zone would be at room temperature. The unwind tension for the top and bottom liners, and the rewind tension for the resultant coated film can be all set to 89 N (20 lbs.). The gap between the two liners at the nip formed by the notched bar and the flatbed can be set to 0.075 mm (3 mils). After curing, the polyfilm can be removed to produce a "riblet" micro-structured cross-linked polyurethane on the UV reflective film.

The anti-reflective surface structured UV reflective multilayer optical film can then be laminated to a photovoltaic module using cross-linkable adhesives.

Prophetic Example 14 (A Prophetic Example)

The anti-reflective surface structured UV reflective multilayer optical Film 3 made as described in Example 4 can further coated with alternating moisture barrier layers of silicon aluminum oxide and acrylate polymer opposite the anti-reflective surface structured layer.

The anti-reflective surface structured UV reflective multilayer optical barrier layer can then be laminated to a photovoltaic module using cross-linkable adhesives.

Example 15 (A Prophetic Example)

A UV reflective multilayer optical Film 5 can be made with first optical layers of PET1 and second optical layers of coPMMA1. The PET1 and coPMMA1 can be coextruded through a multilayer polymer melt manifold to form a stack of 224 optical layers. The layer thickness profile (layer thickness values) of this UV reflector can be adjusted to be approximately a linear profile with the first (thinnest) optical layers adjusted to have about a ¼ wave optical thickness (index times physical thickness) for 370 nm light and progressing to the thickest layers which can be adjusted to be about ¼ wave thick optical thickness for 430 nm light. Layer thickness profiles of such films can be adjusted to provide for improved spectral characteristics using the axial rod apparatus taught in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers of PET1 (260 micrometers thickness each) can be coextruded on either side of the optical stack. 2 wt % of UV absorber ("TINUVIN 1577 UVA") can be compounded into these PET protective skin layers. This multilayer coextruded melt stream can be cast onto a chilled roll at 5.4 meters per minute creating a multilayer cast web approximately 500 micrometers (20 mils) thick. The multilayer cast web can then be preheated for about 10 seconds at 95° C. and biaxially oriented at a draw ratios of 3.5×3.7. The oriented multilayer film can be further heated at 225° C. for 10 seconds to increase crystallinity of the PET layers.

Polyethylenenaphthalate (Film 6) can be made with the same PEN as described in Comparative Example A by extruding polymer onto a chilled roll at 5.4 meters per minute creating a cast web about 500 micrometers (20 mils) thick The cast web can then be heated in a tenter oven at 145° C. for 10 seconds prior to being biaxially oriented to a draw ratio of 3.8×3.8. The oriented multilayer film can then be further heated to 225° C. for 10 seconds to increase crystallinity of the PEN layers.\

Film 5 can then be laminated to Film 6 using an optically clear adhesive (e.g., "OPTICALLY CLEAR LAMINATING ADHESIVE PSA 8171") for outdoor use.

Example 16 (A Prophetic Example)

A UV reflective multilayer optical Film 3 can be made as described in Example 4 and coated with cross-linked polyurethane abrasion resistant coatings.

Polyurethane films can be prepared using a notched bar flatbed coating apparatus and the following procedure: A helical blade mixer can be used to mix 1368 grams of a urethane monomer ("KFLEX 188") with 288 grams of UV absorber ("TINUVIN 405"), 144 grams of HALS ("TINUVIN 123"), and 4.3 grams of a catalyst "DABCO T12") for about 10 minutes. This polyol mixture can be degassed in a vacuum oven at 60° C. for 15 hours, then loaded into plastic Part A dispensing cartridges and kept warm at 50° C. A polyisocyante "DESMODUR N3300A" can be loaded into Part B dispensing cartridges and also kept warm at 50° C. A variable drive pump would be set to have a volumetric ratio of Part A:Part B of 100:77. A 30.5 cm 12 inch) long static mixer would be used to blend the two components prior to coating. The UV reflective film would be coated at a line speed of 1.5 m/min. (5 feet per minute). The heated platen oven would have 5 zones, each 4 feet (1.2 m) long. The temperature of the first 4 zones would be set to 71° C. (160° F.) while the last zone would be at room temperature. The unwind tension for the top and bottom liners, and the rewind tension for the resultant coated film would all be set to 89 N (20 lbs.). The gap between the two liners at the nip formed by the notched bar and the flatbed would be set to 0.075 mm (3 mils). UV reflective multilayer optical Film 3 would then have a UV stable cross-linked polyurethane coating with thickness of approximately 0.075 mm (3 mils).

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A UV stable multi-layer optical film comprising at least a plurality of first and second optical polymeric layers having opposing first and second major surfaces and collectively reflecting at least 50 percent of incident UV light over at least a 30 nanometer wavelength range in a wavelength range from at least 300 nanometers to 400 nanometers, a third optical polymeric layer proximate to the first major surface of the plurality of first and second optical polymeric layers, the third optical polymeric layer absorbing at least 50 percent incident UV light over at least a 30 nanometer wavelength range from at least 300 nanometers to 400 nanometers, and a fourth optical polymeric layer proximate to the second major surface of the plurality of at least first and second optical polymeric layers, wherein the fourth optical polymeric layer comprises polyethylene naphthalate.

2. The UV stable multi-layer optical film of claim 1, wherein incident UV light transmission through at least the plurality of first and second and third optical polymeric layers is less than 5 percent in a wavelength range from at least 300 nanometers to 400 nanometers.

3. The UV stable multi-layer optical film of claim 1 having a UV transmission band edge in a range from 10 to 90 percent transmission spanning less than 20 nanometers.

4. The UV stable multi-layer optical film of claim 1 having a UV transmission band edge in a range from 10 to 90 percent transmission spanning less than 10 nanometers.

5. The UV stable multi-layer optical film of claim 1 having a thickness in a range from 25 micrometers to 250 micrometers.

6. The UV stable multi-layer optical film of claim 1, wherein the plurality of the first and second optical layers have a collective thickness in a range from 15 micrometers to 25 micrometers.

7. An assembly comprising the UV stable multi-layer optical film of claim 1 and a barrier layer.

8. The assembly of claim 7, wherein the barrier layer comprises at least first and second polymer layers separated by an inorganic barrier layer.

9. A composite article comprising a substrate having a major surface, and the assembly of claim 7 on at least a portion of the major surface.

10. A sign comprising the assembly of claim 7.

11. An LCD comprising the assembly of claim 7.

12. A building exterior comprising the assembly of claim 7.

13. A photovoltaic module comprising the assembly of claim 7.

14. A composite article comprising a substrate having a major surface, and the film of claim 1 on at least a portion of the major surface.

15. A vehicle window comprising the film of claim 1.

16. A commercial graphic sign comprising the film of claim 1.

17. A light assembly comprising the film of claim 1.

18. A sign comprising the film of claim 1.

19. An LCD comprising the film of claim 1.

20. A building exterior comprising the film of claim 1.

21. A photovoltaic module comprising the film of claim 1.

22. The photovoltaic module of claim 21 that is a flexible module.

23. The UV-stable multi-layer optical film of claim 1, wherein the first optical polymeric layers comprise at least one of PMMA, PC, or PET, and wherein the second optical polymeric layers comprise at least one of PMMA, CoPMMA, and copolymers derived from tetrafluoroethylene, hexafluoropropylene, and vinylidene fluoride.

24. The UV stable multi-layer optical film of claim 23, wherein the at least first optical polymeric layer comprises PMMA or PC.

25. The UV-stable multi-layer optical film of claim 1, wherein the third optical polymeric layer comprises at least one of PET, CoPET, PC, PMMA, CoPMMA, or blends of PMMA and PVDF.

* * * * *

UNITED STATES PATENT AND TRADEMARK OFFICE
CERTIFICATE OF CORRECTION

PATENT NO. : 10,514,482 B2
APPLICATION NO. : 15/082181
DATED : December 24, 2019
INVENTOR(S) : Timothy Hebrink It is certified that error appears in the above-identified patent and that said Letters Patent is hereby corrected as shown below:

In the Specification

Column 1
Line 67, Delete "0.0.5" and insert -- 0.5 --, therefor.

Column 2
Line 29, Delete "0.0.5" and insert -- 0.5 --, therefor.
Line 42, Delete "0.0.5" and insert -- 0.5 --, therefor.
Line 67, Delete "0.0.5" and insert -- 0.5 --, therefor.

Column 3
Line 12 (Approx.), Delete "0.0.5" and insert -- 0.5 --, therefor.

Column 4
Line 64, Delete "napththalate)" and insert -- naphthalate) --, therefor.

Column 5
Line 66, Delete "birefringement" and insert -- birefringent --, therefor.

Column 7
Line 11, Delete "isotatctic" and insert -- isotactic --, therefor.

Column 8
Line 65, Delete "Tarryton," and insert -- Tarrytown, --, therefor.

Column 9
Line 1, Delete "benzotiazole," and insert -- benzothiazole, --, therefor.

Column 10
Line 41, Delete "polyethyl enenapththalate," and insert -- polyethylenenaphthalate, --, therefor.

Signed and Sealed this
Seventh Day of July, 2020

Andrei Iancu
*Director of the United States Patent and Trademark Office*

Column 15
Line 51, Delete "2, 5-toluene" and insert -- 2,5-toluene --, therefor.
Line 51, Delete "2, 4-toluene" and insert -- 2,4-toluene --, therefor.

Column 16
Line 33, Delete "OCN—ZNCO," and insert -- OCN—Z—NCO, --, therefor.

Column 23
Line 47, Delete "(02)," and insert -- (O2), --, therefor.

Column 24
Line 14, Delete "Elsever," and insert -- Elsevier, --, therefor.
Line 37, Delete "atoms" and insert -- atoms. --, therefor.

Column 27
Line 36, Delete "micrometers" and insert -- micrometers. --, therefor.

Column 28
Line 60, Delete "micrometers" and insert -- micrometers. --, therefor.

Column 34
Line 1, Delete "film o" and insert -- film --, therefor.
Line 19, Delete "42" and insert -- 142 --, therefor.
Line 64, Delete "PEXIGLAS" and insert -- PLEXIGLASS --, therefor.

Column 36
Line 36, Delete "Tarryton," and insert -- Tarrytown, --, therefor.

Column 38
Line 1, Delete "PET 1" and insert -- PET1 --, therefor.

Column 42
Line 43, Delete "thick" and insert -- thick. --, therefor.
Line 48, Delete "layers.\" and insert -- layers. --, therefor.